(12) United States Patent
Mizusaki et al.

(10) Patent No.: US 11,016,345 B2
(45) Date of Patent: May 25, 2021

(54) LIQUID CRYSTAL CELL AND LIQUID CRYSTAL DISPLAY DEVICE

(71) Applicant: SHARP KABUSHIKI KAISHA, Sakai (JP)

(72) Inventors: Masanobu Mizusaki, Sakai (JP); Tomonori Itoh, Sakai (JP); Takashi Satoh, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 78 days.

(21) Appl. No.: 16/492,585

(22) PCT Filed: Mar. 2, 2018

(86) PCT No.: PCT/JP2018/007952
§ 371 (c)(1),
(2) Date: Dec. 27, 2019

(87) PCT Pub. No.: WO2018/163984
PCT Pub. Date: Sep. 13, 2018

(65) Prior Publication Data
US 2020/0241364 A1   Jul. 30, 2020

(30) Foreign Application Priority Data
Mar. 10, 2017  (JP) .............................. JP2017-046053

(51) Int. Cl.
  *G02F 1/1337*   (2006.01)
  *G02F 1/13363*  (2006.01)
  (Continued)

(52) U.S. Cl.
  CPC .... *G02F 1/133711* (2013.01); *G02F 1/13363* (2013.01); *G02F 1/134363* (2013.01);
  (Continued)

(58) Field of Classification Search
  CPC ......... G02F 1/133707; G02F 1/133711; G02F 1/133723; G02F 1/134363;
  (Continued)

(56) References Cited

U.S. PATENT DOCUMENTS

2013/0107182 A1   5/2013  Hagiwara et al.

FOREIGN PATENT DOCUMENTS

JP    2013054187 A  *  3/2013
WO   2011/158671 A1    12/2011

* cited by examiner

*Primary Examiner* — Sophie Hon
*Assistant Examiner* — Sow-Fun Hon
(74) *Attorney, Agent, or Firm* — ScienBiziP, P.C.

(57) ABSTRACT

A liquid crystal cell 10A according to the present invention includes: a pair of substrates 11 and 12 facing each other and having alignment films 11a and 12a formed on surfaces of the substrates, respectively, the surfaces facing each other; and a liquid crystal layer LC interposed between the substrates 11 and 12. The alignment films 11a and 12a contain a polymer for alignment films which has a hydrazide functional group represented by Chemical Formula (1).

(1)

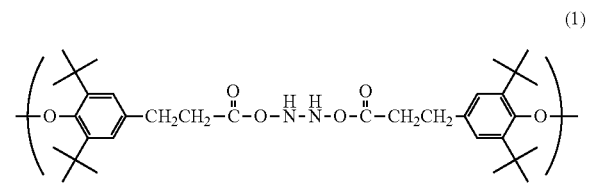

15 Claims, 6 Drawing Sheets

(51) Int. Cl.
  *G02F 1/1343* (2006.01)
  *G02F 1/137* (2006.01)
(52) U.S. Cl.
  CPC ...... *C09K 2323/02* (2020.08); *G02F 1/13712* (2021.01); *G02F 1/134372* (2021.01)
(58) Field of Classification Search
  CPC ............. G02F 1/134372; G02F 1/1362; G02F 1/13712; G02F 1/13363; G02F 1/133555; G02F 2203/09; C09K 2323/02–0273
  See application file for complete search history.

LIQUID CRYSTAL CELL AND LIQUID CRYSTAL DISPLAY DEVICE

TECHNICAL FIELD

The present invention relates to a liquid crystal cell and a liquid crystal display device.

BACKGROUND ART

A liquid crystal display device includes a liquid crystal panel as a display unit which displays information such as an image or the like. The liquid crystal panel has a configuration in which a liquid crystal layer is sealed between a pair of substrates which are disposed to face each other. Alignment of a liquid crystal compound in the liquid crystal layer is controlled by an electric field applied to the liquid crystal layer, and an amount of light passing through the liquid crystal layer is controlled.

Further, the liquid crystal display device is largely classified into three types including a "transmissive type", a "reflective type", and a "semi-transmissive type" depending on a manner of supplying light to the liquid crystal panel. The transmissive type represents a manner in which light is supplied from a light source (backlight) installed adjacently to a back surface of the liquid crystal panel and displaying is performed by using light transmitted through the liquid crystal panel. The reflective type represents a manner in which displaying is performed by using light obtained by reflecting external light such as natural light or the like with an electrode (reflector) or the like in the liquid crystal panel. The semi-transmissive type represents a manner in which the transmissive type and the reflective type are combined with each other (for example, see Patent Document 1).

Among these, the reflective type liquid crystal display device and the semi-transmissive type liquid crystal display device each include a reflector formed of a conductive material in a film form, such as aluminum (Al), silver (Ag), or the like in the liquid crystal panel. The reflector is formed of the conductive material in a film form, such as aluminum (Al), silver (Ag), or the like, and is formed on an inner surface of one substrate of the liquid crystal panel, the inner surface being adjacent to the liquid crystal layer. Further, this type of reflector sometimes includes a reflector having a micro reflective structure (hereinafter, referred to as an MRS structure) in which multiple rugged portions are formed on a surface of the reflector for the purpose of increasing a viewing angle or the like.

The reflector having the MRS structure is formed to cover an interlayer insulating layer formed on a transparent substrate (for example, a glass substrate) constituting the substrate. Multiple rugged portions formed by using a photolithography technology are present on a surface of the interlayer insulating layer, and the reflector having the multiple rugged portions formed on the surface thereof is formed on the interlayer insulating layer along the rugged portions of the interlayer insulating layer. The interlayer insulating layer is mainly formed of a positive photoresist material including a polymer, a photoacid generator, a photosensitizer, and the like, and naphthoquinone diazide (hereinafter, referred to as NQD) is used as the photosensitizer. Note that an alignment film is laminated on the surface of the reflector, the alignment film being formed of an organic material such as polyimide or the like.

RELATED ART DOCUMENT

Patent Document

Patent Document 1: WO 2011/158671

Problem to be Solved by the Invention

In the liquid crystal display device including the reflector having the MRS structure, some portions of the reflector are in direct contact with the interlayer insulating layer or the alignment film formed of the organic material. Therefore, the material (for example, Al or Ag) forming the reflector can easily become an ion ($Al^{3+}$ or the like) by contacting moisture. Furthermore, NQD is included in the inside of the interlayer insulating layer as described above, and once NQD is irradiated with light, NQD (a-1) first turns into a compound (a-2) and then a carboxylic acid compound (a-3) is formed by a reaction illustrated in FIG. 1. The carboxylic acid compound (a-3) reacts with, for example, an epoxy compound included in the liquid crystal layer, the alignment film, and the like in advance to disappear. However, a part of the carboxylic acid compound (a-3) without reacting with the epoxy compound moves from the inside of the interlayer insulating layer, passes through the reflector, and then is eluted into the alignment film or the liquid crystal layer. Furthermore, the ion ($Al^{3+}$ or the like) generated from the reflector is also eluted into the alignment film or the liquid crystal layer. Then, a redox reaction between the ion generated from the reflector, and a carboxyl group of the carboxylic acid compound (a-3) occurs as illustrated in FIG. 2, so that a radical is generated from the carboxyl group, the redox reaction being represented by Formulas (B-1) to (B-4).

In a case where the liquid crystal display device has been used for a long time, a carboxylic acid compound in a radical state passes through the inside of the alignment film and is further eluted into a surface of the alignment film or the liquid crystal layer to become an impurity, and the impurity causes a flicker due to a decrease in voltage holding ratio, or persistence due to an increase in residual direct current (DC).

In particular, a negative liquid crystal material easily absorbs a larger amount of moisture in comparison to a positive liquid crystal material, and elution of a radical substance due to the redox reaction easily occurs. A negative liquid crystal molecule contains a larger amount of atoms with a high polarity, such as an oxygen atom (O), a fluorine atom (F), a chlorine atom (Cl), or the like, in comparison to a positive liquid crystal molecule, and an alkoxy group containing an oxygen atom, and a fluorine atom (F) are sometimes contained in the same molecule, so that polarity of the liquid crystal molecule becomes higher than that of the positive liquid crystal molecule. Therefore, the negative liquid crystal molecule easily absorbs moisture with a high polarity.

DISCLOSURE OF THE PRESENT INVENTION

An object of the present invention is to provide a liquid crystal cell and a liquid crystal display device, in which a decrease in voltage holding ratio and an increase in the residual DC are suppressed.

Means for Solving the Problem

A liquid crystal cell according to the present invention includes: a pair of substrates facing each other and having alignment films formed on surfaces of the substrates, respectively, the surfaces facing each other; and a liquid crystal layer interposed between the substrates. The alignment films contain a polymer for alignment films which has a hydrazide functional group represented by Chemical Formula (1).

[Chem. 1]

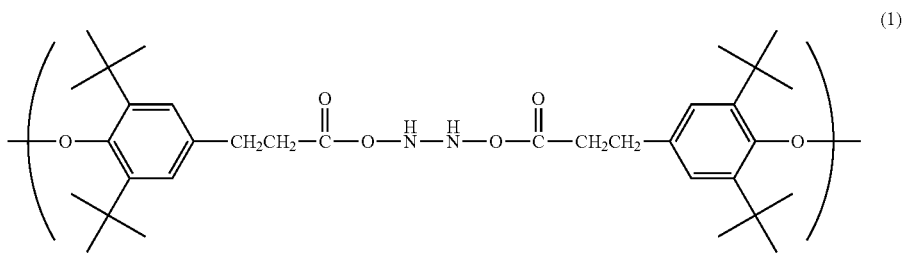

In the liquid crystal cell, the polymer for alignment films may have a main chain including at least one selected from the group consisting of a polyamic acid, polyimide, polysiloxane, polyacryl, polymethacryl, and polyvinyl, and the hydrazide functional group may be connected to the main chain.

Preferably, in the liquid crystal cell, the main chain of the polymer for alignment films may include a polyamic acid and/or polyimide.

In the liquid crystal cell, the polymer for alignment films may have a photoreactive functional group.

In the liquid crystal cell, the photoreactive functional group may be at least one selected from the group consisting of a cinnamate group, a chalcone group, a coumarin group, an azobenzene group, and a tolane group.

In the liquid crystal cell, the polymer for alignment films may be a polyamic acid represented by Chemical Formula (2) or an imide product of the polyamic acid.

[Chem. 2]

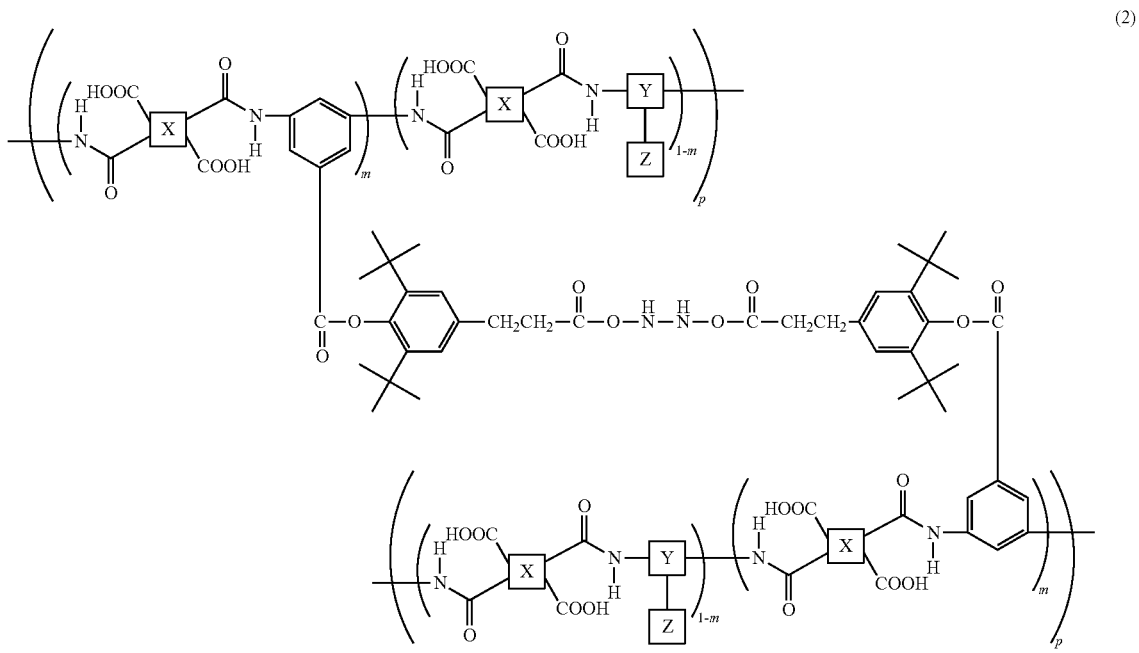

(In Chemical Formula (2), p is any natural number, m is 0.001 or more and 0.1 or less, X includes structures represented by Chemical Formulas (3-1) to (3-12), Y includes structures represented by Chemical Formulas (4-1) to (4-17), and Z includes structures represented by Chemical Formulas (5-1) to (5-8))
[Chem. 3]
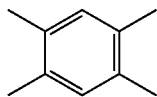
(3-1)
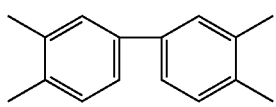
(3-2)
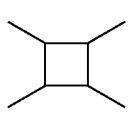
(3-3)
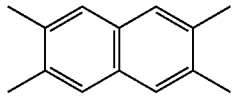
(3-4)
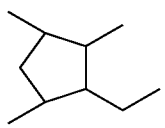
(3-5)
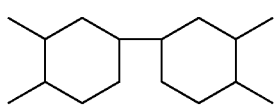
(3-6)
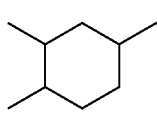
(3-7)
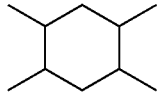
(3-8)
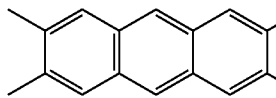
(3-9)
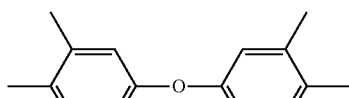
(3-10)
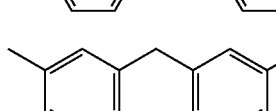
(3-11)
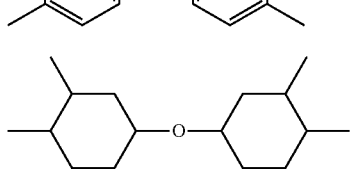
(3-12)
[Chem. 4]
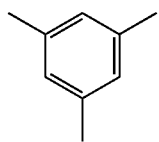
(4-1)
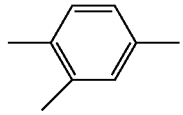
(4-2)
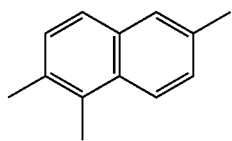
(4-3)
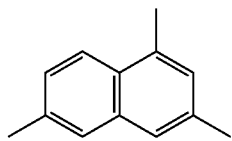
(4-4)
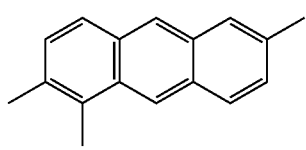
(4-5)
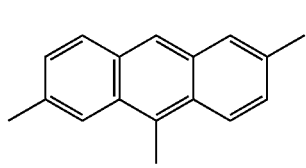
(4-6)
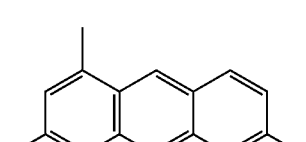
(4-7)
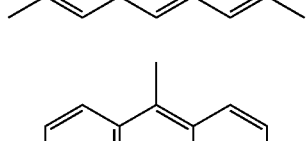
(4-8)
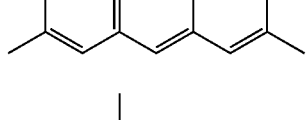
(4-9)
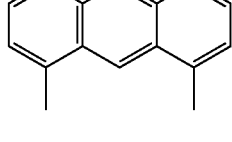
(4-10)

-continued (4-11)
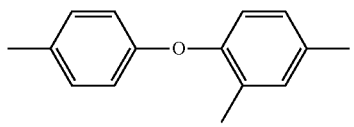

(4-12)
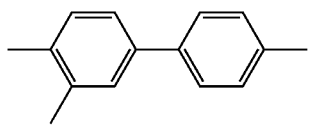

(4-13)
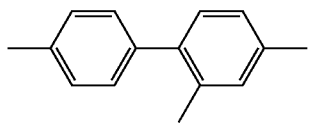

(4-14)
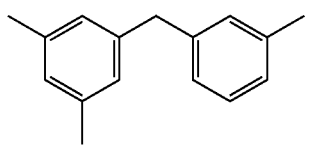

(4-15)
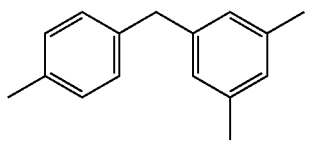

(4-16)
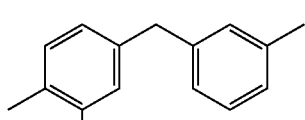

(4-17)
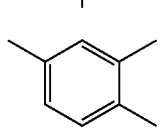

[Chem. 5]

(5-1) —H (5-2) —CH$_3$ (5-3) —C$_2$H$_5$ (5-4) —CF$_3$ (5-5) 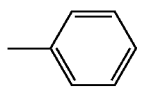

(5-6) 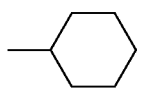

(5-7) 

(5-8) 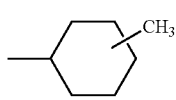

In the liquid crystal cell, the liquid crystal layer may contain a liquid crystal material having a negative dielectric anisotropy.

In the liquid crystal cell, the dielectric anisotropy (Δε) of the liquid crystal material may be −0.5 or less.

In the liquid crystal cell, at least one of the pair of substrates may include an electrode formed of at least one material selected from the group consisting of aluminum (Al), silver (Ag), zinc (Zn), copper (Cu), and alloys thereof.

In the liquid crystal cell, the electrode may be formed on an insulating layer.

In the liquid crystal cell, the insulating layer may be formed of a positive photoresist material.

In the liquid crystal cell, the electrode may have a micro reflective structure in which multiple rugged portions are formed on a surface of the electrode.

The liquid crystal cell may be a reflective type liquid crystal cell or a semi-transmissive liquid crystal cell.

In the liquid crystal cell, a display mode of the liquid crystal cell may be any one of a vertical alignment twisted nematic (VA-TN) mode, a vertical alignment electrically controlled birefringence (VA-ECB) mode, an in-plane switching (IPS) mode, and a fringe field switching (FFS) mode.

A liquid crystal display device according to the present invention includes any one of the liquid crystal cells described above.

Advantageous Effect of the Invention

According to the present invention, it is possible to provide the liquid crystal cell and the liquid crystal display device, in which a decrease in voltage holding ratio and an increase in the residual DC are suppressed.

MODES FOR CARRYING OUT THE INVENTION (Liquid Crystal Display Device: Reflective Type)

Figure 3:
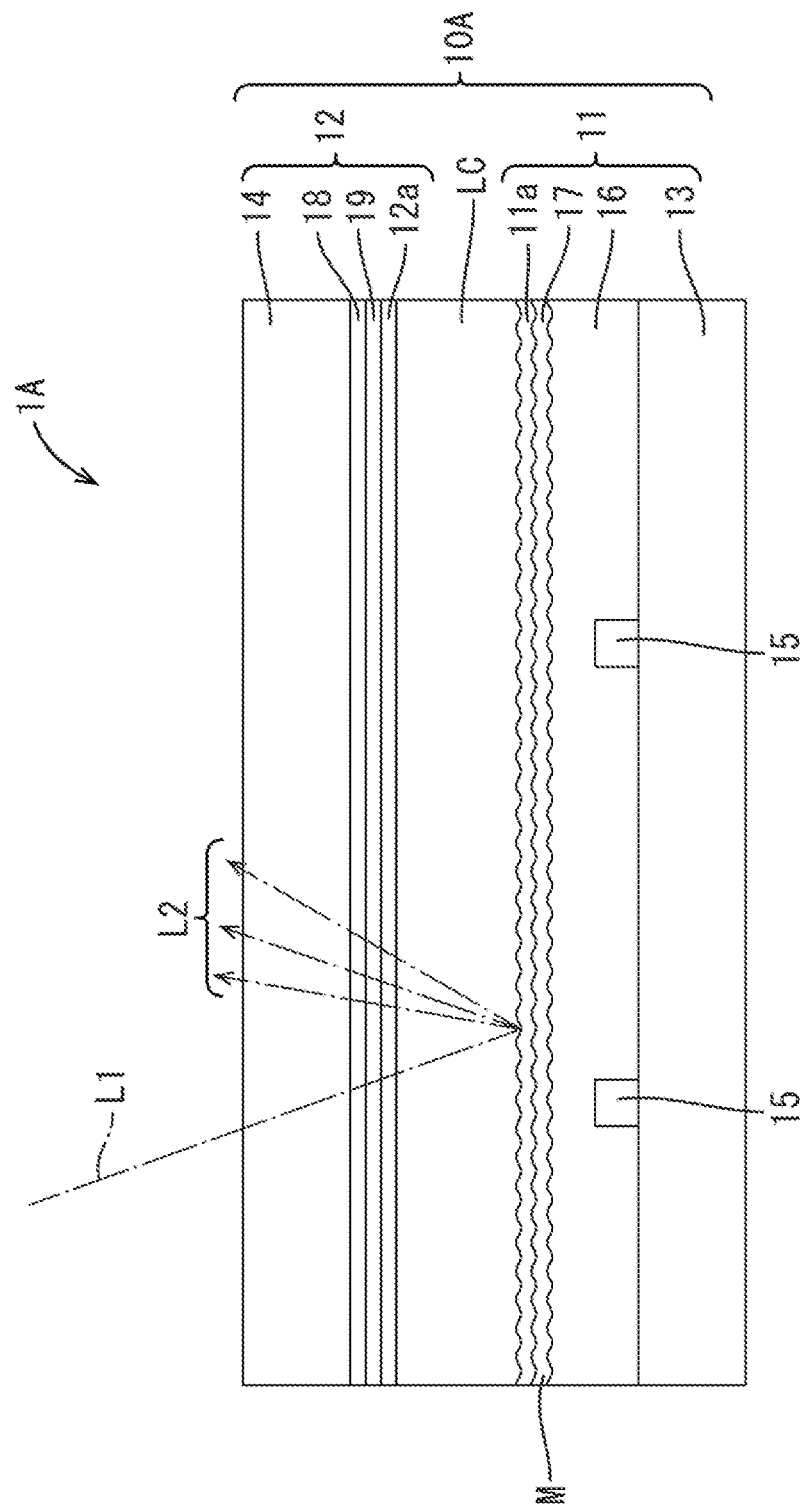
FIG. 3 is an explanatory diagram schematically illustrating a configuration of a liquid crystal display device according to Embodiment 1 of the present invention.

Hereinafter, Embodiment 1 of the present invention will be described with reference to a drawing. FIG. 3 is an explanatory diagram schematically illustrating a configuration of a liquid crystal display device according to Embodiment 1 of the present invention. A liquid crystal display device 1A according to Embodiment 1 is a reflective type liquid crystal display device which displays an image on a display surface by using external light such as natural light, an illumination, or the like. The liquid crystal display device 1A mainly includes a panel-shaped liquid crystal cell 10A. The liquid crystal display device 1A includes a polarizing plate, a phase difference plate, and the like stacked on the liquid crystal cell 10A, in addition to the liquid crystal cell 10A.

(Liquid Crystal Cell)

The liquid crystal cell 10A includes a pair of substrates 11 and 12 facing each other and having alignment films 11a and 12a formed on surfaces of the substrates, respectively, the surfaces facing each other, and a liquid crystal layer LC interposed between the substrates 11 and 12. A sealing material (not illustrated) surrounding the liquid crystal layer LC is interposed between the substrates 11 and 12. Furthermore, a spacer is interposed between the substrates 11 and 12.

Among the pair of substrates 11 and 12, one substrate is a pixel electrode substrate (array substrate) 11, and the other substrate is a opposed substrate 12.

(Pixel Electrode Substrate)

In the pixel electrode substrate (array substrate) 11, a thin film transistor (TFT) 15, a reflective pixel electrode 17, and the like are formed on a transparent supporting substrate (for example, a substrate formed of glass) 13, and the alignment film 11a is formed on a surface (facing surface) facing the opposed substrate 12 which is the other substrate. The reflective pixel electrode 17 has a micro reflective structure (MRS structure) M, and multiple fine rugged portions are formed on a surface of the reflective pixel electrode 17 for the purpose of increasing a viewing angle or the like. The alignment film 11a is formed on the reflective pixel electrode 17 so as to cover the surface on which the multiple rugged portions are formed.

As illustrated in FIG. 3, a thin film transistor 15 used as a switching element is disposed at a predetermined place on the supporting substrate 13. Further, an interlayer insulating layer 16 is formed on the supporting substrate 13 so as to cover the thin film transistor 15.

The interlayer insulating layer 16 is mainly formed of a positive photoresist material including a polymer, a photoacid generator, a photosensitizer, and the like, and multiple fine rugged portions formed by using a photolithography technology are disposed on a surface of the interlayer insulating layer 16. As the photosensitizer of the interlayer insulating layer 16, naphthoquinone diazide (NQD) is used.

The reflective pixel electrode 17 is formed on the interlayer insulating layer 16 having the rugged portions formed on the surface thereof, by using a known film forming technology. The reflective pixel electrode 17 is formed on the interlayer insulating layer 16 along the rugged portions on the surface of the interlayer insulating layer 16, and thus multiple fine rugged portions are formed on the surface of the reflective pixel electrode 17 as well. A material forming the reflective pixel electrode 17 can be at least one selected from the group consisting of aluminum (Al), silver (Ag), zinc (Zn), copper (Cu), and alloys thereof.

As described later, the alignment film 11a is formed by performing an alignment processing such as a rubbing processing, an optical alignment processing, or the like on a film formed of a polymer for alignment films, such as a polyamic acid having a hydrazide functional group, or the like. As the alignment film 11a, various alignment films such as a vertical alignment film, a horizontal alignment film, an optical alignment film, and the like are appropriately selected and used depending on the purpose.

(Opposed Substrate)

In the opposed substrate 12, a color filter (CF) 18 and the like are formed on a transparent supporting substrate (for example, a substrate formed of glass) 14, and the alignment film 12a is formed on a surface (facing surface) facing the pixel electrode substrate 11 which is the other substrate. As illustrated in FIG. 3, the layer-shaped color filter 18 is formed on the supporting substrate 14 of the opposed substrate 12, and a common electrode (facing electrode) 19 is formed so as to cover the color filter 18. The alignment film 12a is formed on the common electrode 19 so as to cover the common electrode 19. As the common electrode 19, for example, a transparent conductive material such as indium tin oxide (ITO), indium zinc oxide (IZO), or the like is used.

Similarly to the alignment film 11a, the alignment film 12a is formed by performing an alignment processing such as a rubbing processing, an optical alignment processing, or the like on a film formed of a polymer for alignment films, such as a polyamic acid having a hydrazide functional group, or the like. Note that details of the alignment film 11a and the alignment film 12a will be described later.

(Liquid Crystal Layer)

For example, a nematic liquid crystal, a smectic liquid crystal, and the like can be used for the liquid crystal layer LC. In a case of a twisted nematic (TN) type liquid crystal cell or a super-twisted nematic (STN) type liquid crystal cell, a nematic liquid crystal having a positive dielectric anisotropy (a positive liquid crystal) is preferable. For example, a biphenyl liquid crystal, a phenylcyclohexane liquid crystal, an ester liquid crystal, a terphenyl liquid crystal, a biphenylcyclohexane liquid crystal, a pyrimidine liquid crystal, a dioxane liquid crystal, a bicyclooctane liquid crystal, a cubane liquid crystal, or the like is used. A chiral agent, a ferroelectric liquid crystal, and the like may be further added to the liquid crystal and used.

Meanwhile, in a case of a vertical alignment type liquid crystal cell, a nematic liquid crystal having a negative dielectric anisotropy (a negative liquid crystal) is preferable. For example, a (di)fluorinated liquid crystal, a dicyanobenzene liquid crystal, a pyridazine liquid crystal, a Schiff base liquid crystal, an azoxy liquid crystal, a biphenyl liquid crystal, a phenylcyclohexane liquid crystal, or the like is used.

A liquid crystal material having a desired dielectric anisotropy ($1e$) is appropriately selected as the liquid crystal material used for the liquid crystal layer LC.

(Liquid Crystal Mode)

A display mode of the liquid crystal cell 10A is appropriately selected depending on the purpose. Examples of the display mode of the liquid crystal cell 10A can include a vertical alignment (VA) (or vertical alignment twisted nematic (VA-TN)) mode in which a liquid crystal molecule has a twisted structure by using vertical alignment films by which alignment processing directions of the substrates are orthogonal to each other, a VA (or vertical alignment electrically controlled birefringence (VA-ECB)) mode in which vertical alignment films by which alignment orientations of the substrates are antiparallel to each other are used in any domain, an in-plane switching (IPS) mode, a fringe field switching (FFS) mode, and the like.

As illustrated in FIG. 3, light L1 incident on the liquid crystal cell 10A from the outside is efficiently reflected by the reflective pixel electrode 17 having the micro reflective structure M, and reflected light L2 is emitted.

(Liquid Crystal Display Device: Semi-Transmissive Type)

Figure 4:
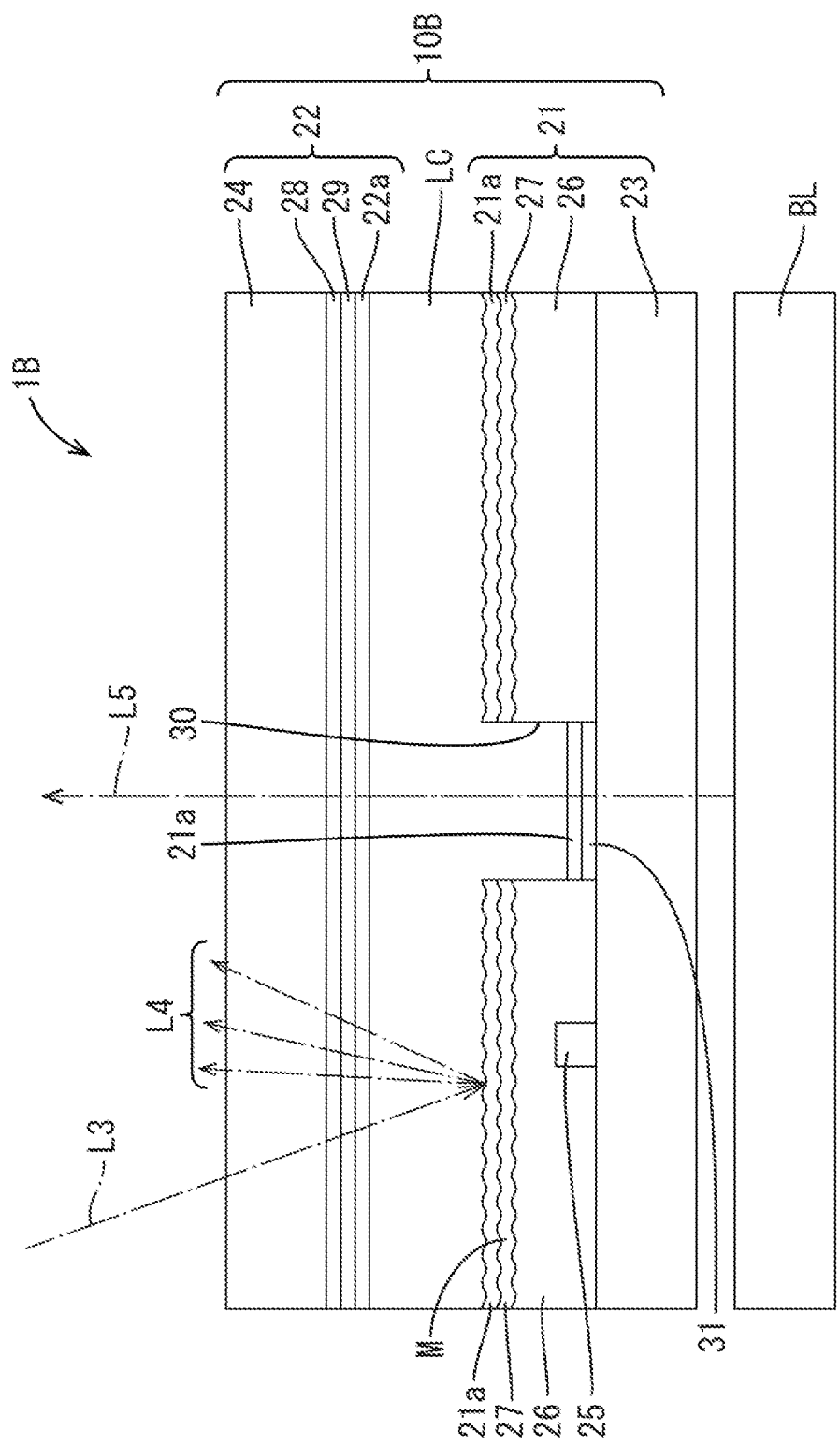
FIG. 4 is an explanatory diagram schematically illustrating a configuration of a liquid crystal display device according to Embodiment 2 of the present invention.

Next, Embodiment 2 of the present invention will be described with reference to a drawing. FIG. 4 is an explanatory diagram schematically illustrating a configuration of a liquid crystal display device 1B according to Embodiment 2 of the present invention. The liquid crystal display device 1B according to Embodiment 2 is a semi-transmissive liquid crystal display device, and displays an image on a display surface by using external light and light from a backlight device BL which is an external light source. Similarly to Embodiment 1 described above, the liquid crystal display device 1B mainly includes a panel-shaped liquid crystal cell 10B, and a backlight device BL which is disposed adjacently to a back surface of the liquid crystal cell 10B and supplies light to the liquid crystal cell 10B. Note that the liquid crystal display device 1B includes a polarizing plate, a phase difference plate, and the like stacked on the liquid crystal cell 10B, in addition to those described above.

(Liquid Crystal Cell)

The liquid crystal cell 10B includes a pair of substrates 21 and 22 facing each other and having alignment films 21a and 22a formed on surfaces of the substrates, respectively, the surfaces facing each other, and a liquid crystal layer LC interposed between the substrates 21 and 22. A sealing material (not illustrated) surrounding the liquid crystal layer LC is interposed between the substrates 21 and 22. Furthermore, a spacer is interposed between the substrates 21 and 22.

Among the pair of substrates 21 and 22, one substrate is a pixel electrode substrate (array substrate) 21, and the other substrate is a opposed substrate 22.

(Pixel Electrode Substrate)

In the pixel electrode substrate (array substrate) 21, a thin film transistor (TFT) 25, a reflective pixel electrode 27, and the like are formed on a transparent supporting substrate (for example, a substrate formed of glass) 23, and the alignment film 21a is formed on a surface (facing surface) facing the opposed substrate 22 which is the other substrate. The reflective pixel electrode 27 has a micro reflective structure (MRS structure) M, and multiple fine rugged portions are formed on a surface of the reflective pixel electrode 27 for the purpose of increasing a viewing angle or the like. The alignment film 21a is formed on the reflective pixel electrode 27 so as to cover the surface on which the multiple rugged portions are formed.

As illustrated in FIG. 4, a thin film transistor 25 used as a switching element is disposed at a predetermined place on the supporting substrate 23. Further, an interlayer insulating layer 26 is formed on the supporting substrate 23 so as to cover the thin film transistor 25.

Similarly to Embodiment 1 described above, the interlayer insulating layer 26 is mainly formed of a positive photoresist material including a polymer, a photoacid generator, a photosensitizer, and the like, and multiple fine rugged portions formed by using a photolithography technology are disposed on a surface of the interlayer insulating layer 26. As the photosensitizer of the interlayer insulating layer 26, naphthoquinone diazide (NQD) is used.

Similarly to Embodiment 1 described above, the reflective pixel electrode 27 is formed on the interlayer insulating layer 26 having the rugged portions formed on the surface thereof, by using a known film forming technology. The reflective pixel electrode 27 is formed on the interlayer insulating layer 26 along the rugged portions on the surface of the interlayer insulating layer 26, and thus multiple fine rugged portions are formed on the surface of the reflective pixel electrode 27 as well. As a material forming the reflective pixel electrode 27, a material similar to those of Embodiment 1 is used.

Note that an opening 30 partially penetrates through the reflective pixel electrode 27. A transmissive pixel electrode 31 formed of a transparent conductive material (ITO, IZO, or the like) is formed in the opening 30. The transmissive pixel electrode 31 is formed on the supporting substrate 23. A part of the alignment film 21a is formed so as to cover the transmissive pixel electrode 31.

Similarly to Embodiment 1, the alignment film 21a is formed by performing an alignment processing such as a rubbing processing, an optical alignment processing, or the like on a film formed of a polymer for alignment films, such as a polyamic acid having a hydrazide functional group, or the like.

(Opposed Substrate)

In the opposed substrate 22, a color filter (CF) 28 and the like are formed on a transparent supporting substrate (for example, a substrate formed of glass) 24, and the alignment film 22a is formed on a surface (facing surface) facing the pixel electrode substrate 21 which is the other substrate. As illustrated in FIG. 4, the layer-shaped color filter 28 is formed on the supporting substrate 24 of the opposed substrate 22, and a common electrode (facing electrode) 29 is formed so as to cover the color filter 28. The alignment film 22a is formed on the common electrode 29 so as to cover the common electrode 29. Similarly to Embodiment 1, the common electrode 29 is formed of a transparent conductive material such as ITO, IZO, or the like.

Similarly to the alignment film 21a, the alignment film 22a is formed by performing an alignment processing such as a rubbing processing, an optical alignment processing, or the like on a film formed of a polymer for alignment films, such as a polyamic acid having a hydrazide functional group, or the like. Note that details of the alignment film 21a and the alignment film 22a will be described later.

(Liquid Crystal Layer)

The same type of liquid crystal material as that of Embodiment 1 described above can be used for the liquid crystal layer LC. A liquid crystal material having a desired dielectric anisotropy (Δε) is appropriately selected as the liquid crystal material used for the liquid crystal layer LC.

(Liquid Crystal Mode)

Similarly to the display mode of the liquid crystal cell 10A, a display mode of the liquid crystal cell 10B may be appropriately selected from known modes.

As illustrated in FIG. 4, light L3 incident on the liquid crystal cell 10B from the outside is efficiently reflected by the reflective pixel electrode 27 having the micro reflective structure M, and reflected light L4 is emitted. Furthermore, light L5 supplied from the backlight device BL toward the liquid crystal cell 10B is incident into the liquid crystal cell 10B from the back surface, transmitted through the transmissive pixel electrode 31 in the opening 30, transmitted through the liquid crystal layer LC and the opposed substrate 22, and emitted from the display surface.

In the respective liquid crystal cells 1A and 1B according to Embodiments 1 and 2 described above, the interlayer insulating layers 16 and 26 each including naphthoquinone diazide (NQD) as the photosensitizer are formed under the reflective pixel electrodes 17 and 27, respectively. The alignment films 11a and 21a are formed on the reflective pixel electrodes 17 and 27, respectively. As described later, the alignment film 11a and the like contain a polymer for alignment films which has a hydrazide functional group, and the hydrazide functional group forms a complex with an ion (for example, an aluminum ion or a silver ion) generated from the reflective pixel electrodes 17 and 27, thereby suppressing the redox reaction illustrated in FIG. 2.

Hereinafter, the alignment film used in the embodiments of the present invention such as Embodiments 1 and 2 described above will be described.

(Alignment Film)

The alignment film contains a polymer for alignment films which has a hydrazide functional group represented by Chemical Formula (1).

[Chem. 6]

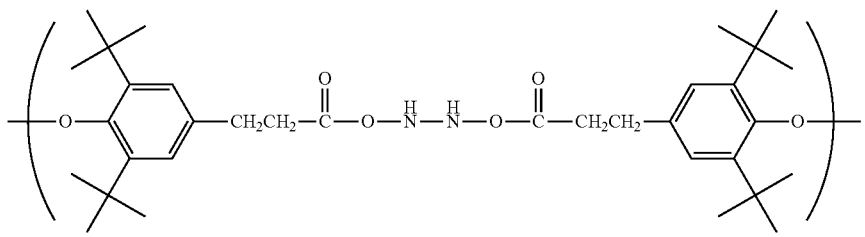

Figure 1:
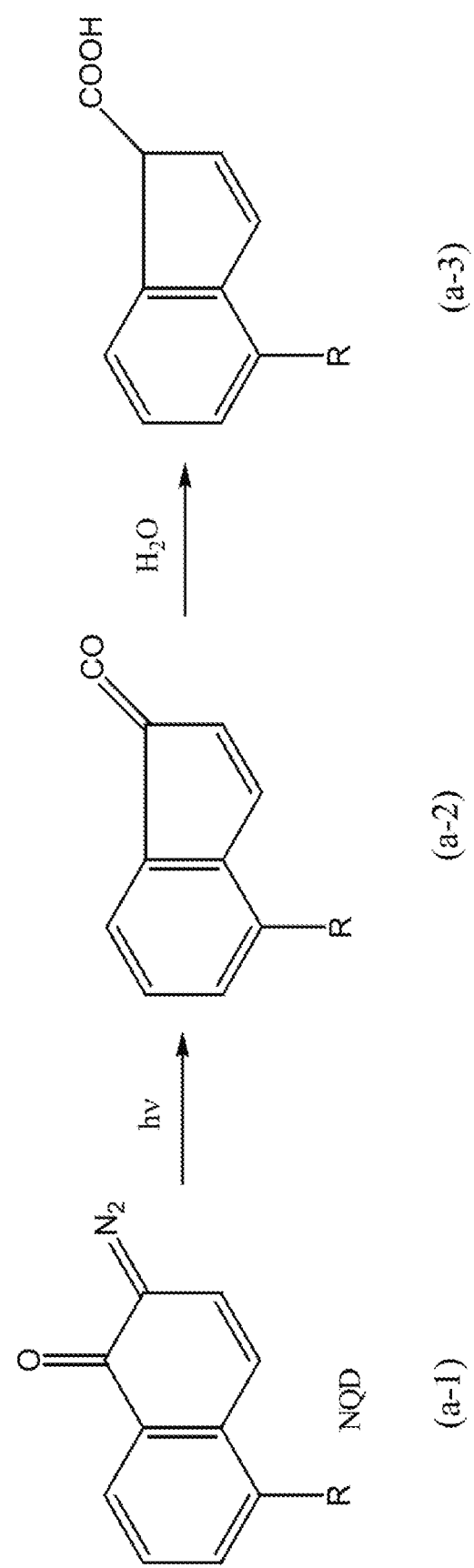
FIG. 1 is an explanatory diagram illustrating a reaction by which a carboxylic acid compound is formed from naphthoquinone diazide through light irradiation.
Figure 2:
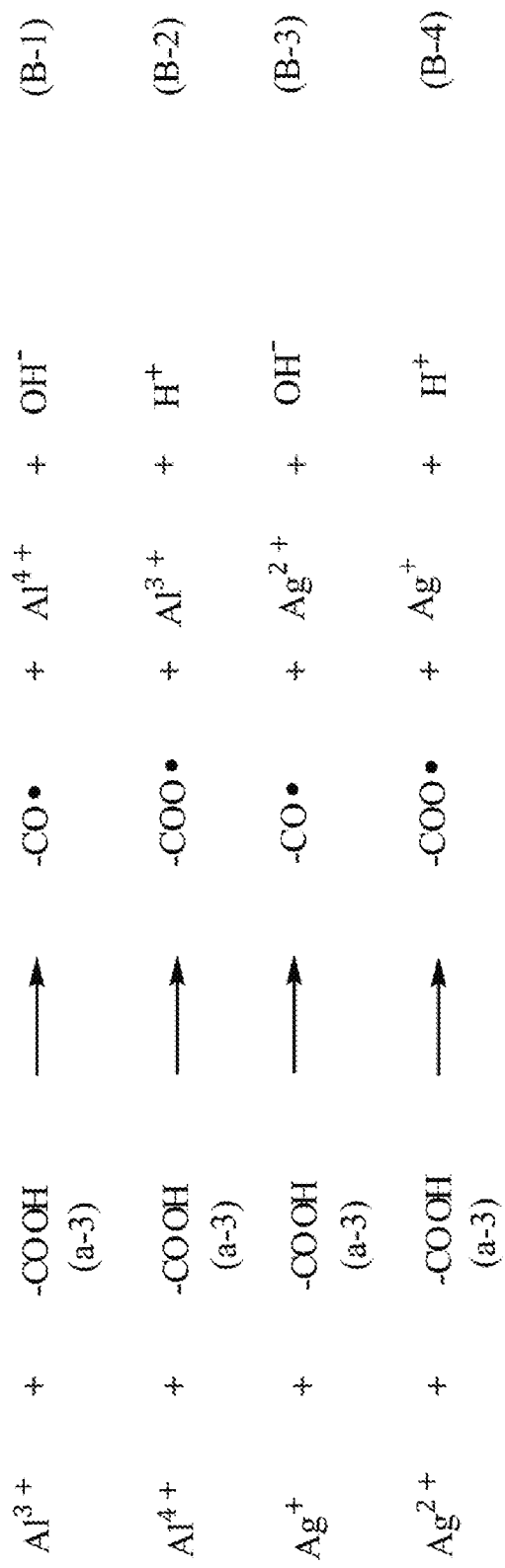
FIG. 2 is an explanatory diagram illustrating a redox reaction between an ion generated from a reflector, and the carboxylic acid compound.

In a case where the polymer for alignment films has such a hydrazide functional group, the hydrazide functional group forms a complex with an ion (for example, an aluminum ion or a silver ion) generated from the reflective pixel electrode, thereby suppressing the redox reaction illustrated in FIG. 2.

The polymer for alignment films has a main chain including at least one selected from the group consisting of a polyamic acid, polyimide, polysiloxane, polyacryl, polymethacryl, and polyvinyl, and the hydrazide functional group is connected to the main chain. When the hydrazide functional group is introduced as a side chain (including a bridge portion connecting main chains to each other) connected to the main chain, rather than as the main chain, the hydrazide functional group easily forms a complex with an aluminum ion or the like.

The main chain of the polymer for alignment films preferably includes a polyamic acid and/or polyimide. Note that in the present description, the "polyamic acid and/or polyimide" may be any one of the polyamic acid and the polyimide, or may be both the polyamic acid and the polyimide.

Further, the polymer for alignment films may have a photoreactive functional group having a structure which varies by a reaction (for example, photoisomerization reaction) when receiving predetermined light (polarized ultraviolet rays or the like) at the time of the optical alignment processing. The photoreactive functional group may be introduced as the main chain of the polymer for alignment films, or may be introduced as a side chain connected to the main chain of the polymer for alignment films.

Examples of the photoreactive functional group include a cinnamate group, a chalcone group, a coumarin group, an azobenzene group, and a tolane group. Note that the photoreactive functional group may be at least one selected from the group consisting of a cinnamate group, a chalcone group, a coumarin group, an azobenzene group, and a tolane group.

Hereinafter, a specific example of the polymer for alignment films will be described.

(Polyamic Acid I)

As the polymer for alignment films, for example, a polyamic acid represented by Chemical Formula (2) can be used.

[Chem. 7]

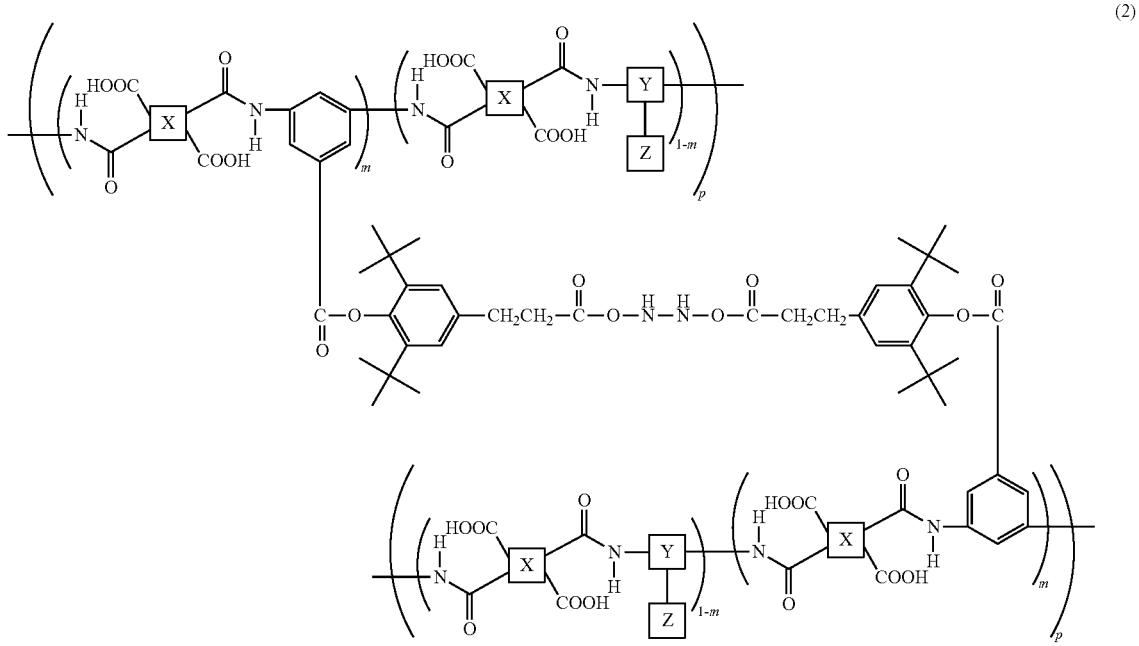

In Chemical Formula (2), p (polymerization degree) is any natural number, m is 0.001 or more and 0.1 or less, and more preferably, 0.01 or more and 0.05 or less. In a case where m is within such a range, it is possible to suppress an increase in viscosity and achieve an effect (forming a complex with an ion) obtained by introducing the hydrazide functional group. Note that in a case where m is larger than 0.1, a viscosity of the polymer for alignment films is increased, so that film formation is hindered.

Further, in a case where the alignment film is a horizontal alignment film or a vertical alignment film, X in Chemical Formula (2) includes structures represented by Chemical Formulas (3-1) to (3-12).

[Chem. 8]

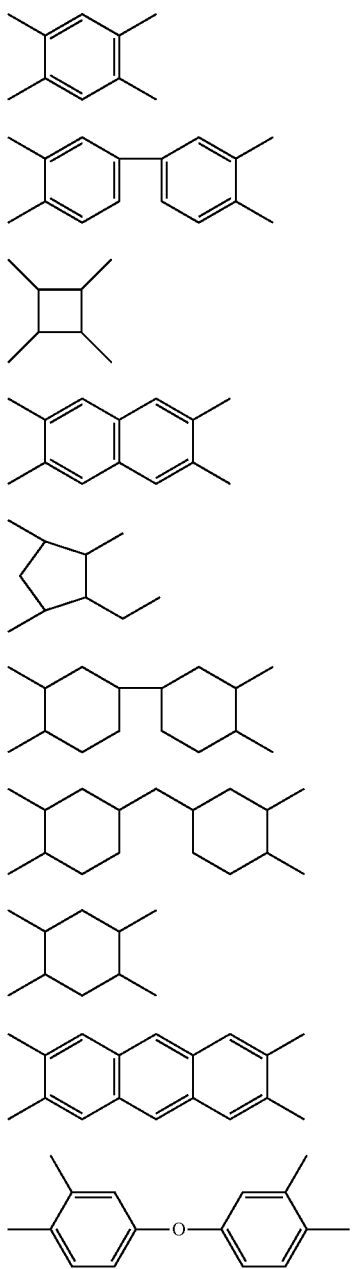

(3-1)
(3-2)
(3-3)
(3-4)
(3-5)
(3-6)
(3-7)
(3-8)
(3-9)
(3-10)

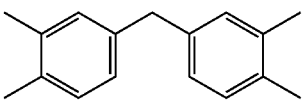
(3-11)

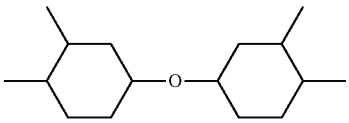
(3-12)

Further, in a case where the alignment film is an optical alignment film (a horizontal optical alignment film or a vertical optical alignment film), X in Chemical Formula (2) includes structures represented by Chemical Formulas (3-13) to (3-16).

[Chem. 9]

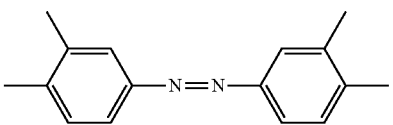
(3-13)

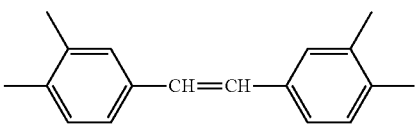
(3-14)

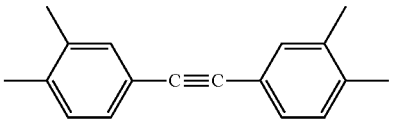
(3-15)

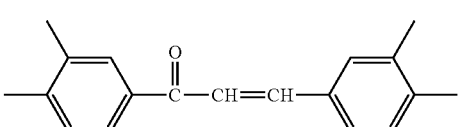
(3-16)

Further, in a case where the alignment film is a horizontal alignment film or a vertical alignment film, Y in Chemical Formula (2) includes structures represented by Chemical Formulas (4-1) to (4-17).

[Chem. 10]

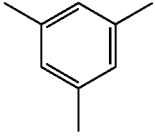
(4-1)

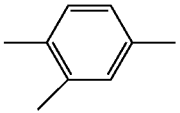
(4-2)

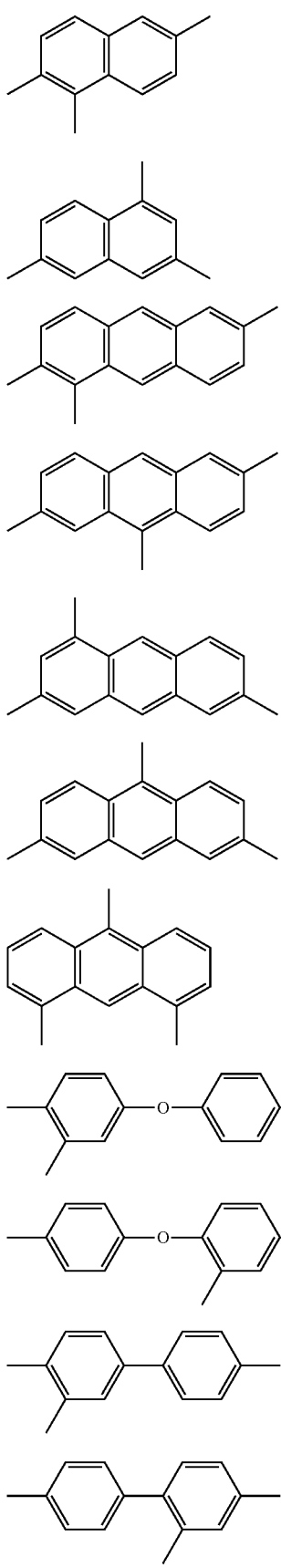

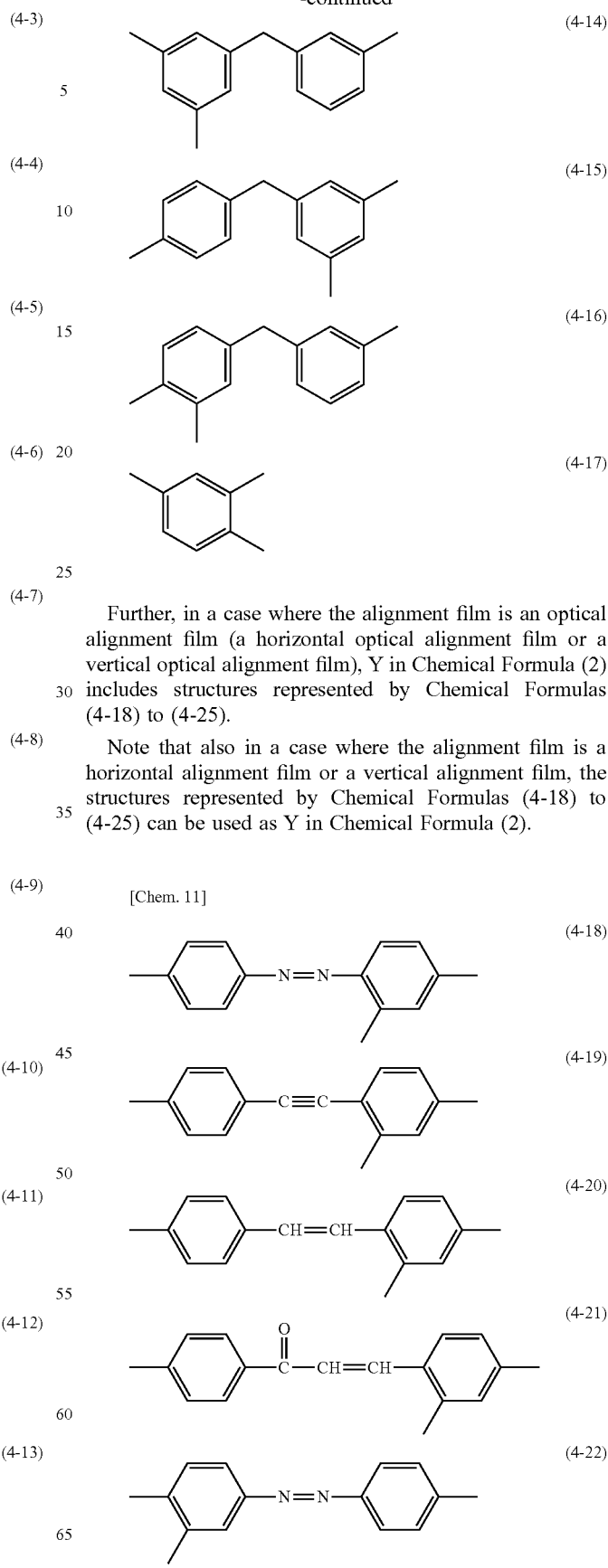

Further, in a case where the alignment film is an optical alignment film (a horizontal optical alignment film or a vertical optical alignment film), Y in Chemical Formula (2) includes structures represented by Chemical Formulas (4-18) to (4-25).

Note that also in a case where the alignment film is a horizontal alignment film or a vertical alignment film, the structures represented by Chemical Formulas (4-18) to (4-25) can be used as Y in Chemical Formula (2).

[Chem. 11]

-continued

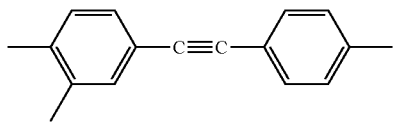
(4-23)

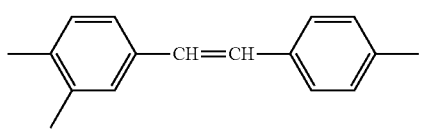
(4-24)

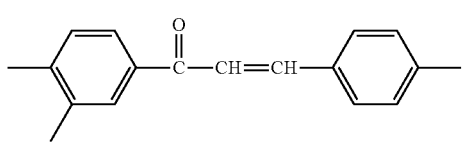
(4-25)

Further, in a case where the alignment film is a horizontal alignment film, Z in Chemical Formula (2) includes structures represented by Chemical Formulas (5-1) to (5-8).

[Chem. 12]

(5-1)

(5-2)

(5-3)

(5-4)

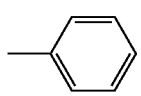
(5-5)

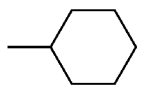
(5-6)

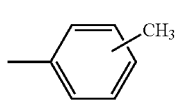
(5-7)

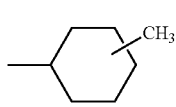
(5-8)

Further, in a case where the alignment film is a vertical alignment film, Z in Chemical Formula (2) includes structures represented by Chemical Formulas (5-9) to (5-15). Note that a symbol "*" in Chemical Formulas (5-9) to (5-15) represents a bond.

[Chem. 13]

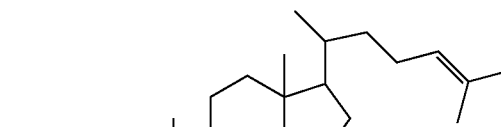
(5-9)

(5-10)

(5-11)

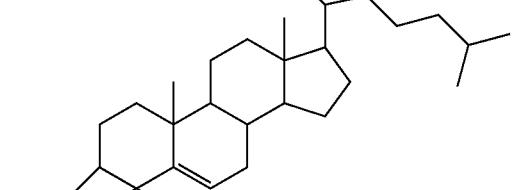
(5-12)

(5-13)

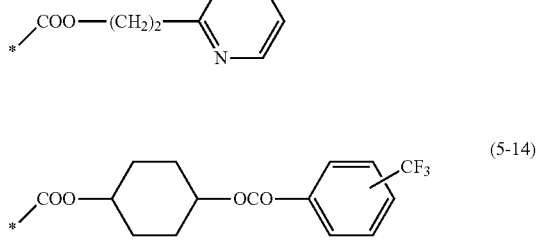
(5-14)

(5-15)

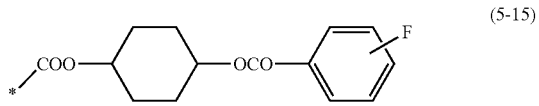

Further, in a case where the alignment film is a horizontal optical alignment film, Z in Chemical Formula (2) includes structures represented by Chemical Formulas (5-16) and (5-17).
[Chem. 14]
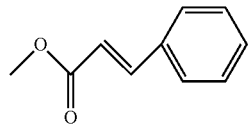
(5-16)
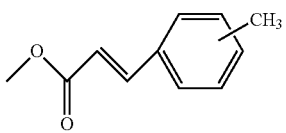
(5-17)
Further, in a case where the alignment film is a vertical optical alignment film, Z in Chemical Formula (2) includes structures represented by Chemical Formulas (5-18) to (5-38).
[Chem. 15]
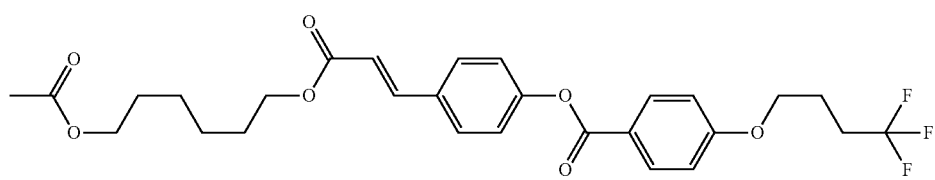
(5-18)
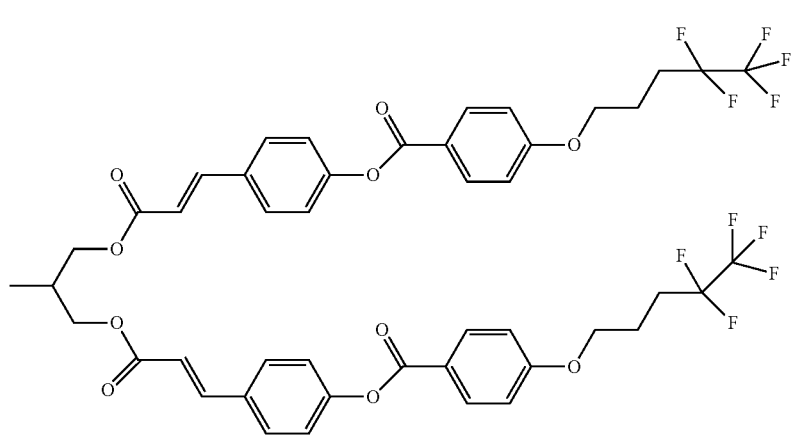
(5-19)
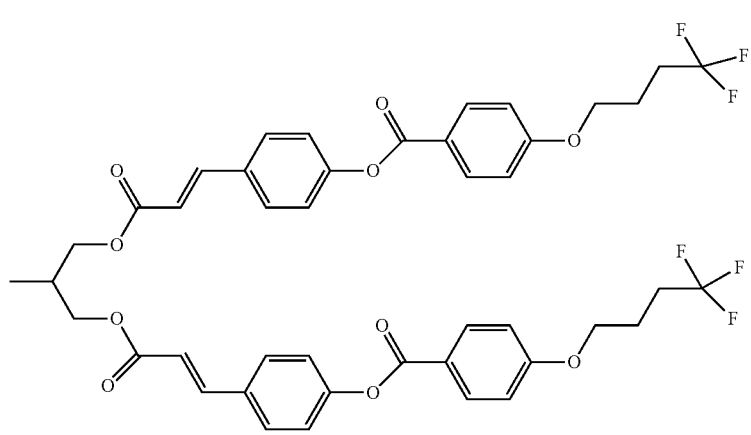
(5-20)

-continued
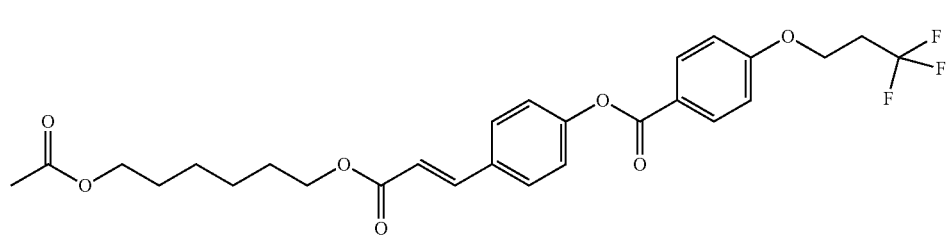
(5-21)
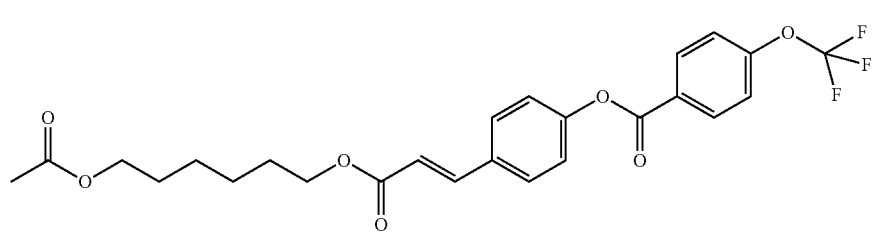
(5-22)
[Chem. 16]
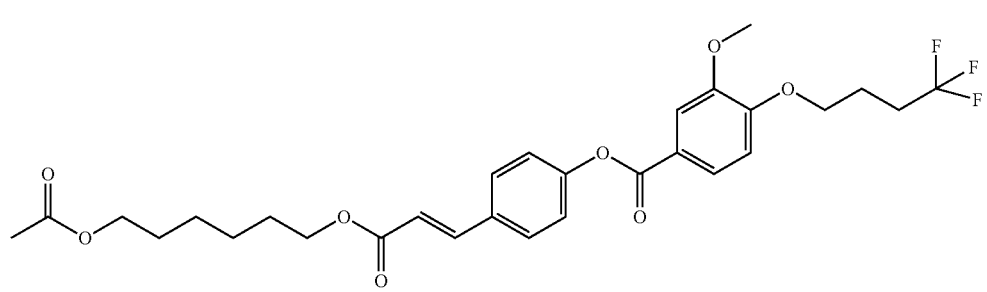
(5-23)
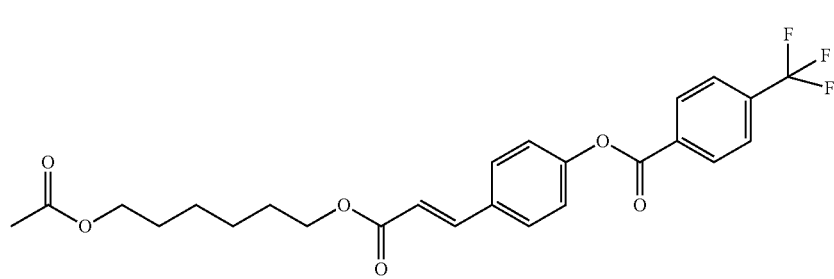
(5-24)
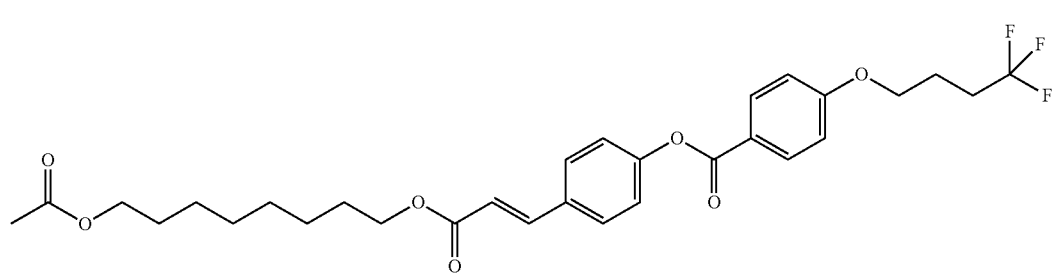
(5-25)
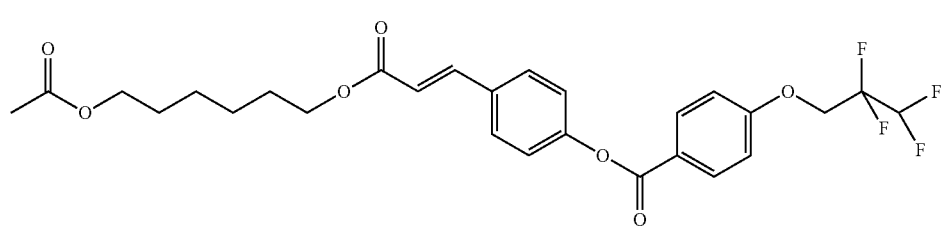
(5-26)

-continued
(5-27)
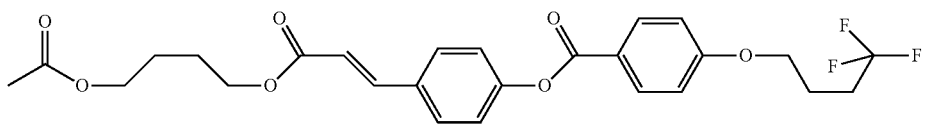
(5-28)
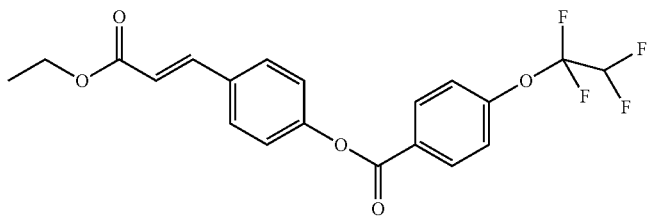
[Chem. 17]
(5-29)
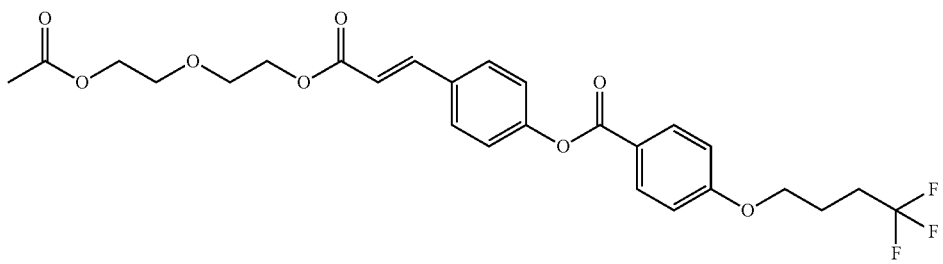
(5-30)
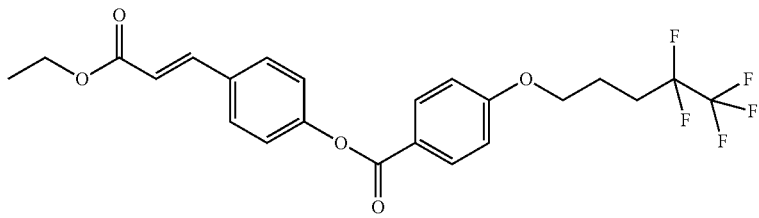
(5-31)
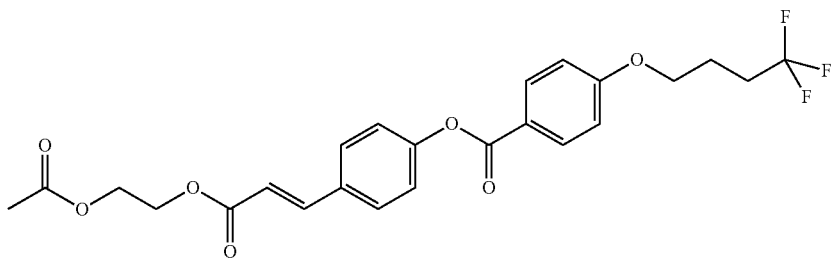
(5-32)
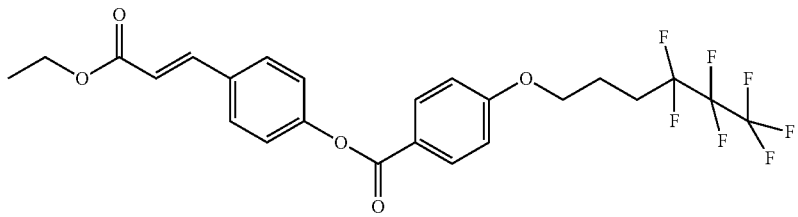
(5-33)
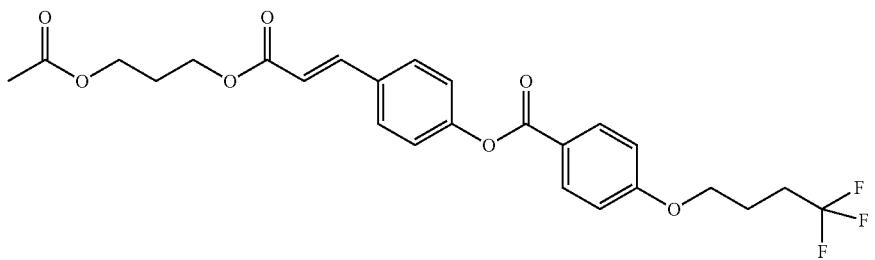

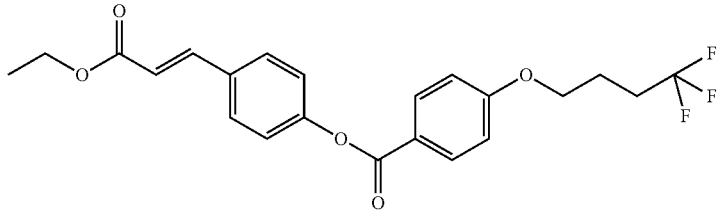
(5-34)
[Chem. 18]
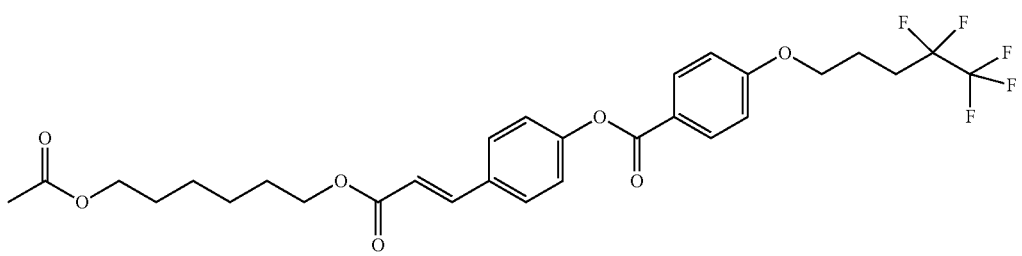
(5-35)
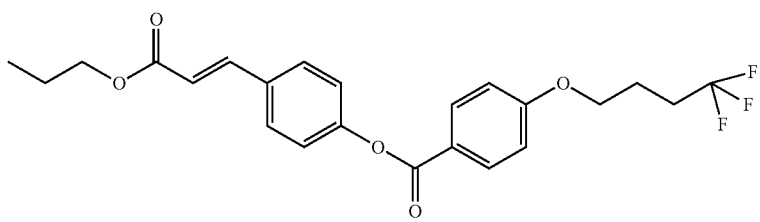
(5-36)
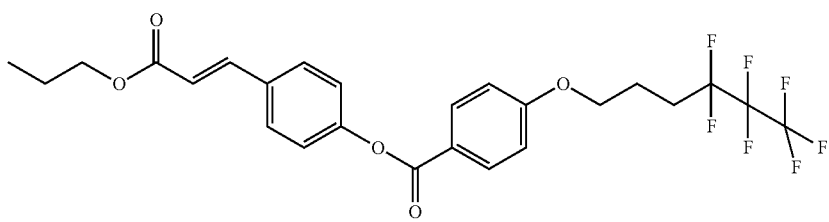
(5-37)
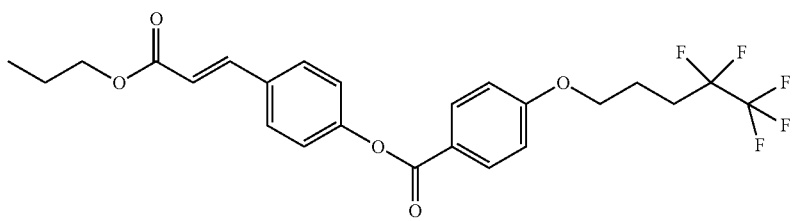
(5-38)

The polymer for alignment films, which is formed of the polyamic acid represented by Chemical Formula (2), may be appropriately imidized, and for example, polyimide represented by Chemical Formula (6) may be used as the polymer for alignment films. Note that conditions of X, Y, Z, p, and m in Chemical Formula (6) are the same as those in Chemical Formula (2).

[Chem. 19]

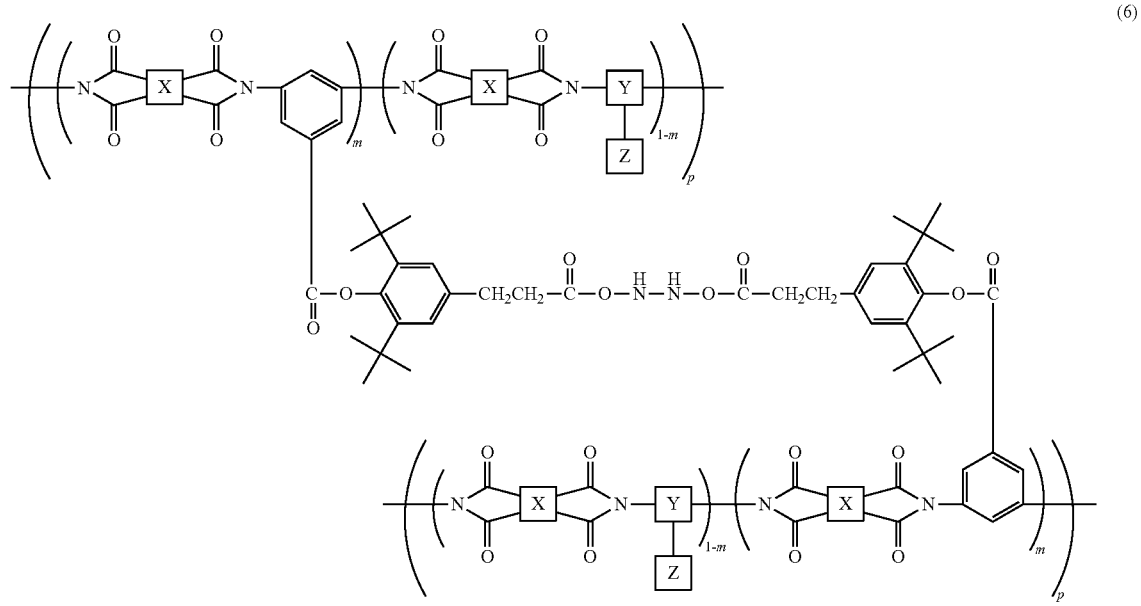

(6)

(Polyamic Acid II)

Further, as another polymer for alignment films, a polyamic acid represented by Chemical Formula (7) can be considered.

[Chem. 20]

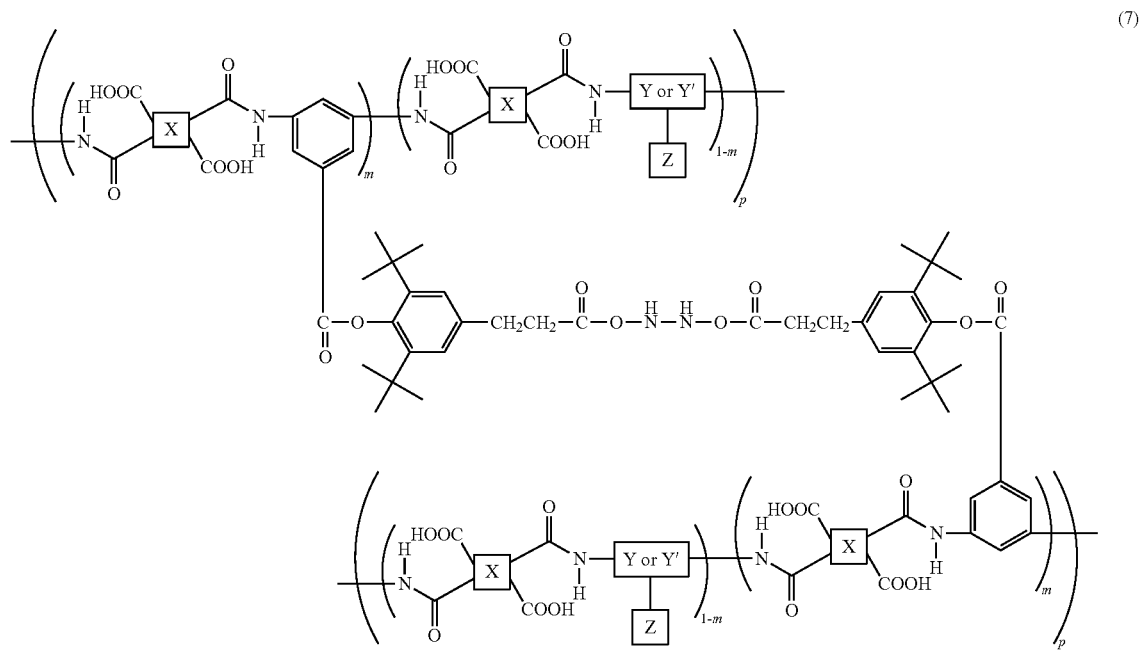

(7)

Note that conditions of X, p, and m in Chemical Formula (7) are the same as those in Chemical Formula (2). Further, a monomer unit in Chemical Formula (7) has Y or Y'. In a case where the monomer unit in Chemical Formula (7) has the structure Y, the structure Y is the same as that in Chemical Formula (2) (that is, any one of the structures represented by Chemical Formulas (4-1) to (4-25)). In a case where the monomer unit in Chemical Formula (7) has the structure Y, the structure Y includes a structure Z as a side chain. The structure Z is the same as that in Chemical Formula (2) (that is, any one of the structures represented by Chemical Formulas (5-1) to (5-38)).

Whereas, in a case where the monomer unit in Chemical Formula (7) includes the structure Y', a structure having two bonds is applied as the structure Y'. A specific example of the structure Y' will be described later. Note that the structure Y' does not include a side chain represented as the structure Z.

An introduction ratio of the structure Y in Chemical Formula (7) is not particularly limited as long as the object of the present invention is not impaired, but, for example, is set to 0.1 to 0.4 (10 to 40%).

The polymer for alignment films, which is formed of the polyamic acid represented by Chemical Formula (7), may be appropriately imidized, so that a polymer for alignment films formed of polyimide may be used.

(Polyamic Acid III)

Further, as another polymer for alignment films, a polyamic acid represented by Chemical Formula (8) can be considered.

[Chem. 21]

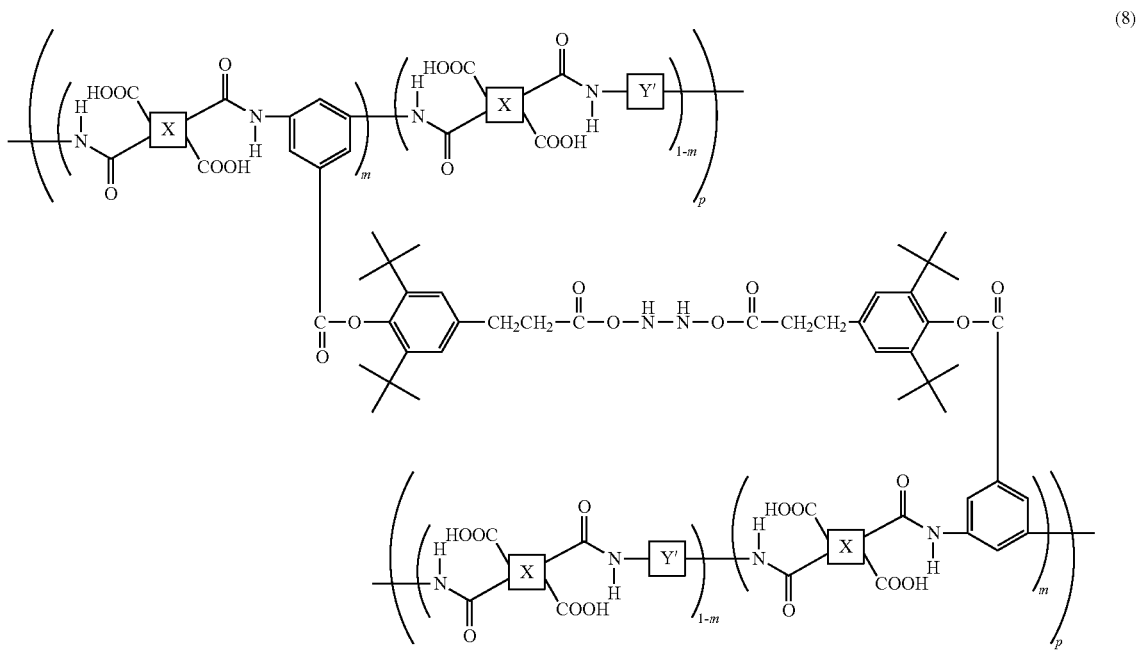

Conditions of X, p, and m in Chemical Formula (8) are the same as those in Chemical Formula (2). Further, Y' in Chemical Formula (8) is the same as that in Chemical Formula (7).

The polymer for alignment films, which is formed of the polyamic acid represented by Chemical Formula (8), may be appropriately imidized, so that a polymer for alignment films formed of polyimide may be used.

(Polysiloxane)

Further, as another polymer for alignment films, polysiloxane represented by Chemical Formula (9) can be considered.

[Chem. 22]

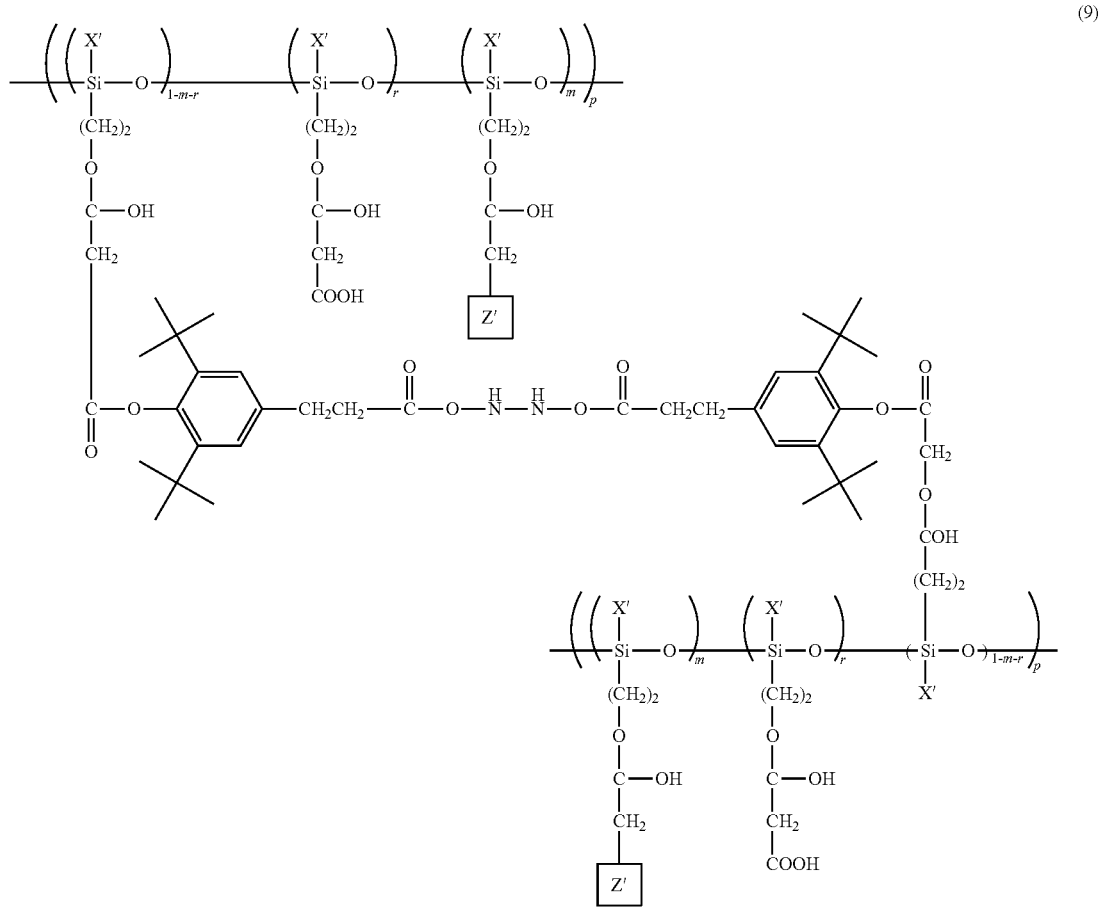

(9)

p (polymerization degree) in Chemical Formula (9) is any natural number, both m and r are 0 or more and less than 1 ($0 \leq m<1$, $0 \leq r<1$), and m+r<1.

Further, X' in Chemical Formula (9) includes substituents such as hydrogen (—H), a hydroxyl group (—OH), and an alkoxy group such as a methoxy group (—OCH$_3$) or an ethoxy group (—OC$_2$H$_5$).

Z' in Chemical Formula (9) is the same as Z in Chemical Formula (2) (that is, any one of the structures represented by Chemical Formulas (5-1) to (5-38)), or include structures represented by Chemical Formulas (10-1) and (10-2).

[Chem. 23]

(10-1)

C$_3$H$_6$C$_2$F$_5$—O—⌬—COO—⌬—CH=CH—COO—

(10-2)

C$_6$H$_{13}$—O—⌬—COO—⌬—CH=CH—COO—

Note that a combination of the polymer which has the hydrazide functional group described above, and a polymer which does not have the hydrazide functional group may be used as the polymer for alignment films. Further, a combination of polymers having the hydrazide functional group may also be used. The polymer for alignment films is appropriately dissolved in an organic solvent to be prepared as an alignment agent for alignment films. A method of applying the alignment agent on a substrate is not particularly limited, and a known method such as, for example, spin coating or the like is applied.

Further, a film formed of the alignment agent is fired in two stages including pre-firing and main firing. The film formed of the alignment agent is heat-treated at, for example, 80° C. for two minutes by the pre-firing to remove the organic solvent or the like in the film. Further, the main firing is performed for the purposes of imidizing a polyamic acid, minimizing conformation of a polymer chain in an optical alignment film, and the like. In the main firing, the film is heated at a higher temperature (for example, 200° C.) than that in the pre-firing for a longer time (for example, 40 minutes) than that in the pre-firing.

As described above, the alignment processing with respect to the alignment film (film) may be a rubbing processing or an optical alignment processing in which irradiation with light such as polarized ultraviolet rays is performed at a predetermined angle.

(Synthesis of Monomer Having Hydrazide Functional Group)

Figure 5:
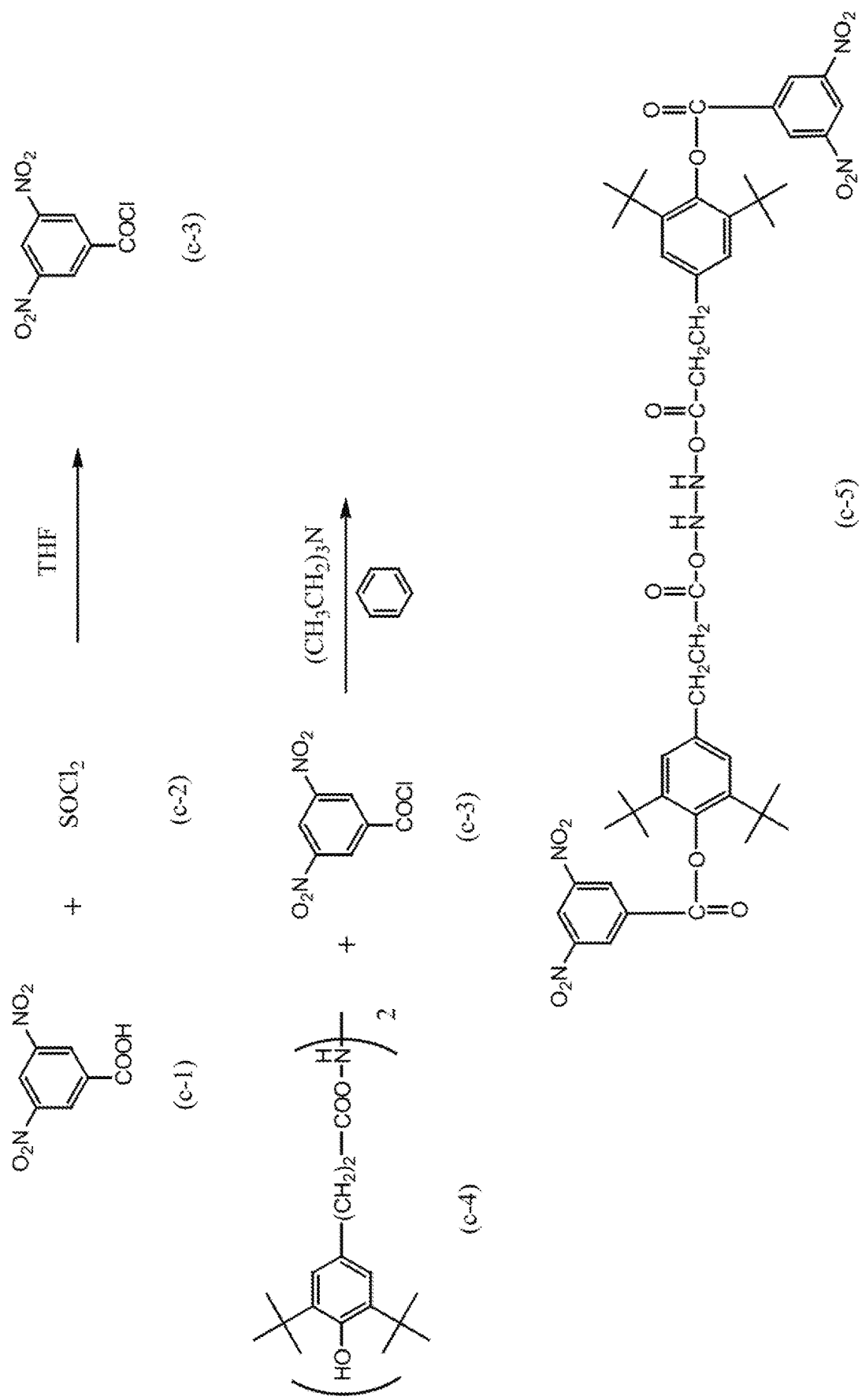
FIG. 5 is an explanatory diagram illustrating the first half of a synthesis example of a diamine monomer having a hydrazide functional group.

Here, a synthesis example (scheme) of a diamine monomer having the hydrazide functional group will be described with reference to FIGS. 5 and 6. As illustrated in FIG. 5, thionyl chloride (c-2) was added dropwise to a tetrahydrofuran (THF) solution (30 mL) containing 4 g (18.9 mmol, molecular weight: 212) of 3,5-dinitrobenzoic acid (c-1) to obtain 3,5-dinitrobenzoyl chloride (c-3) (16.4 mmol, molecular weight: 230.5, yield: 87%). Then, the THF solution (20 mL) containing 3.46 g (15 mmol) of 3,5-dinitrobenzoyl chloride (c-3) was added dropwise to a benzene solution (40 mL) containing 3.5 g (6 mmol, molecular weight: 586) of "Irganox MD1024 (trade name) (manufactured by BASF)" (c-4) and 2 g (20 mmol) of triethylamine at room temperature under a nitrogen atmosphere. Then, the mixture was reacted at room temperature for two hours. After the reaction ends, impurities were extracted with water, and then the reactant was purified by column chromatography (developing solvent:toluene/ethyl acetate=4/1) to obtain 2.75 g (yield: 47%) of a dinitro compound (c-5) (molecular weight: 974).

Figure 6:
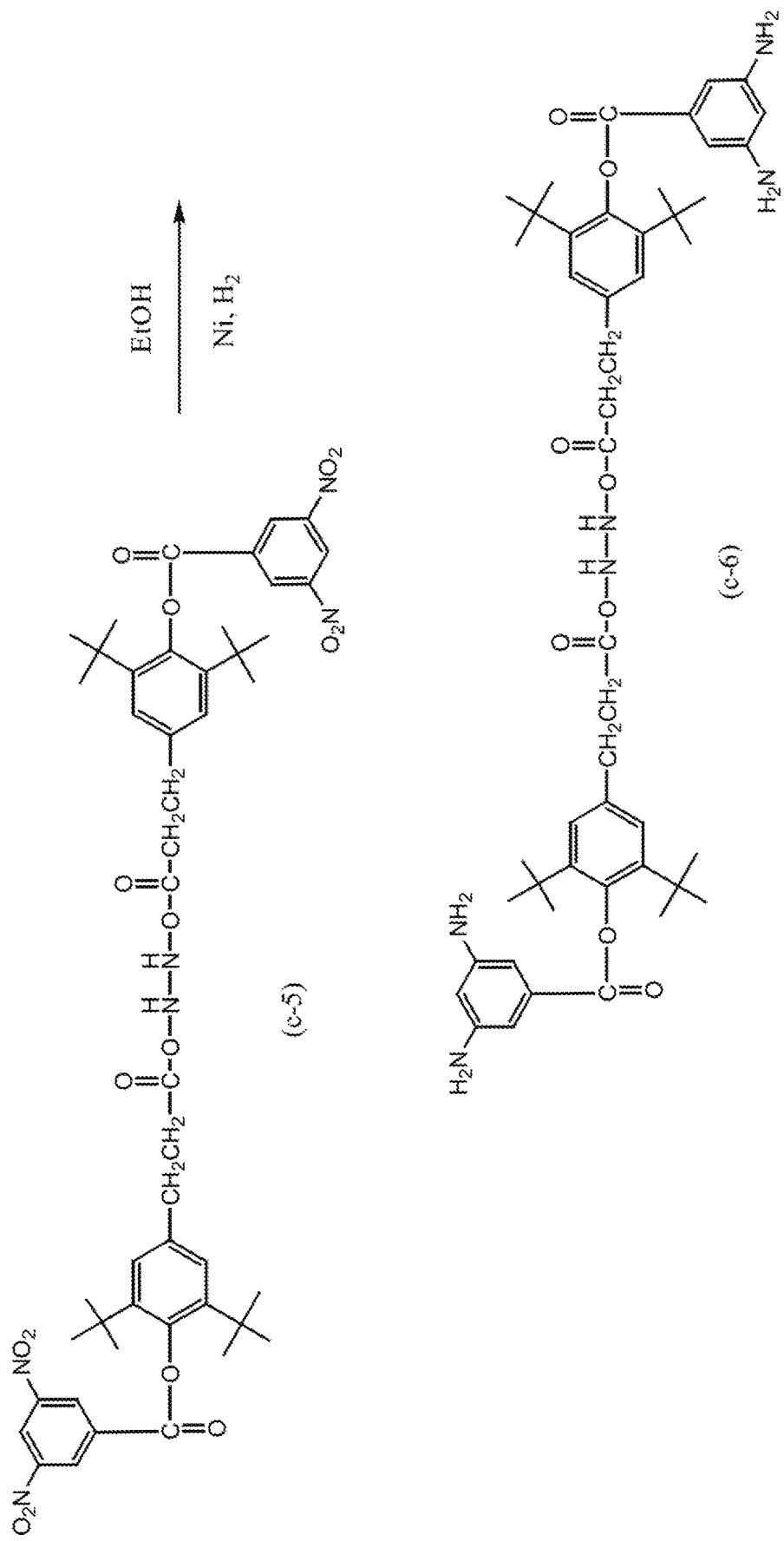
FIG. 6 is an explanatory diagram illustrating the latter half of the synthesis example of the diamine monomer having a hydrazide functional group.

Next, as illustrated in FIG. 6, 2.5 g of the dinitro compound (c-5) (2.6 mol, molecular weight: 974) was dissolved in 20 mL of "Solmix AP-I" (manufactured by Japan Alcohol Trading Co., Ltd.), 0.3 g of Raney nickel was added thereto, and the reaction system was put in an autoclave which was purged with hydrogen and left at room temperature and a pressure of 0.4 MPa overnight. Then, a stop of the reaction was confirmed by high-performance liquid chromatography (HPLC), a reaction liquid was filtered through Celite (registered trademark), and the filtrate was concentrated until distillation stopped. The obtained crude liquid was distilled under reduced pressure to obtain 1.71 g (2.0 mmol, yield: 77%) of a diamine compound (c-6) (molecular weight: 854).

(Synthesis of Polymer for Alignment Films which has Hydrazide Functional Group)

Next, a synthesis example of a polyamic acid using the diamine compound (c-6) will be described. Here, a synthesis example in which an introduction amount of the diamine compound (c-6) having the hydrazide functional group is 10 mol % will be described.

An acid anhydride (1 mol) represented by Chemical Formula (11-3) was added to a γ-butyrolactone solution containing a diamine compound (0.3 mol) having a side chain for a vertical alignment film and represented by Chemical Formula (11-1), p-phenylenediamine (0.65 mol) represented by Chemical Formula (11-2), and the diamine compound (0.05 mol, see FIG. 6) represented by symbol (c-6), and the mixture was reacted at 60° C. for 12 hours to obtain a polyamic acid having a random structure.

[Chem. 24]

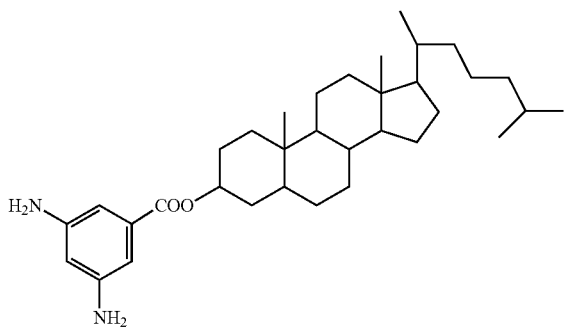

(11-1)

[Chem. 25]

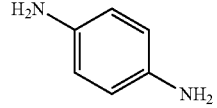

(11-2)

[Chem. 26]

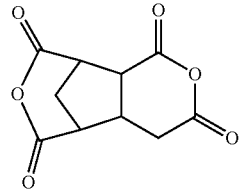

(11-3)

Moreover, in order to imidize the obtained polyamic acid, the following processing was performed. An excessive amount of pyridine (3 mol) and acetic anhydride (3 mol) was added to the γ-butyrolactone solution of the obtained polyamic acid, and the mixture was reacted at 150° C. for 3 hours. A weight average molecular weight of the obtained polyimide in this manner was 70,000, and a molecular weight distribution was 2.9. Further, an imidization ratio was 40% or more. In this way, the polyamic acid and the polyimide having the hydrazide functional group were obtained.

Note that polyamic acids and polyamides of which introduction ratios of the hydrazide functional group are different from each other can be obtained by appropriately adjusting the introduction amount (ratio) of the diamine compound (c-6).

A thickness of the alignment film is not particularly limited as long as the object of the present invention is not impaired, but is appropriately set.

When the alignment film containing the polymer for alignment films which has the hydrazide functional group as described above is formed on each substrate of the liquid crystal cell, a decrease in voltage holding ratio and an increase in residual DC are suppressed in the liquid crystal cell of the present embodiment. This is because the hydrazide functional group introduced into the alignment film forms a complex with an ion (an aluminum ion or the like) generated from an electrode such as the reflective pixel electrode, and as a result, the redox reaction illustrated in FIG. 2 is suppressed.

Note that although a configuration in which the common electrode is formed in the opposed substrates of the liquid crystal cell has been described in Embodiments 1 and 2 described above, the present invention is not limited thereto, and for example, a configuration in which the common electrode is formed in the pixel electrode substrate may be possible.

EXAMPLES

Hereinafter, the present invention will be described in more detail on the basis of Examples. Note that the present invention is not limited to these Examples.

Synthesis of Polyamic Acid

Synthesis Example 1

A polyamic acid (m=0) represented by Chemical Formula (7) in which m was 0 was synthesized.

[Chem. 27]

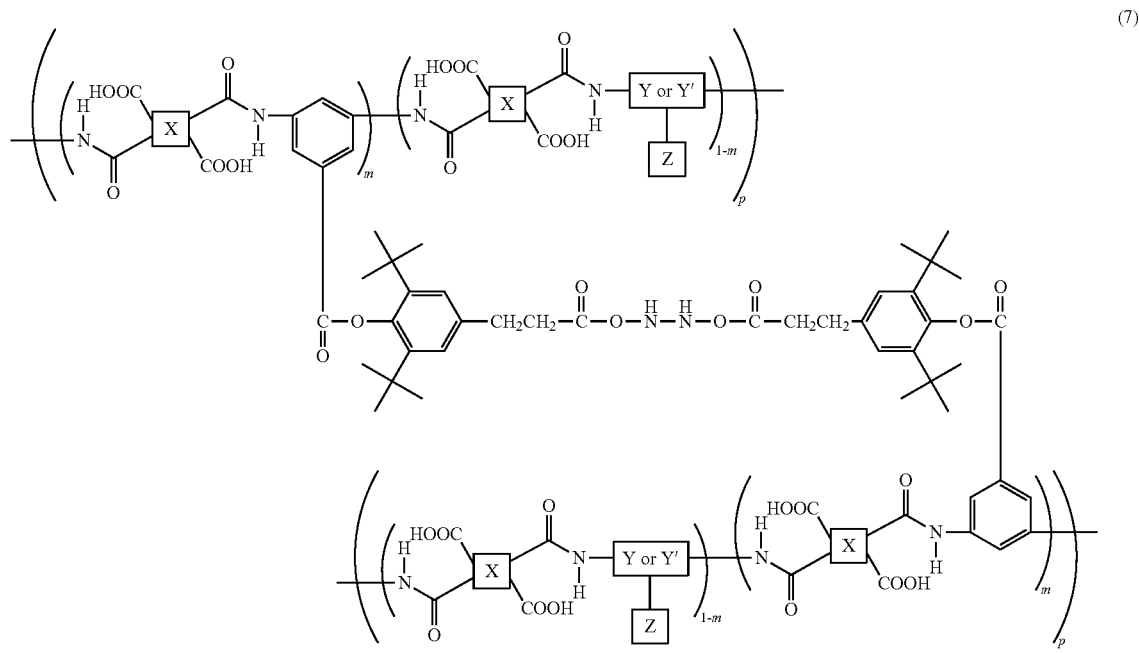

(7)

p (polymerization degree) in Chemical Formula (7) is any natural number. Further, X in Chemical Formula (7) is the structure represented by Chemical Formula (3-5).

[Chem. 28]

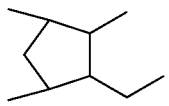

(3-5)

Further, in a case where the monomer unit in Chemical Formula (7) has the structure Y, the structure Y includes the structure represented by Chemical Formula (4-1), and includes the structure Z as a side chain. The structure Z includes the structure represented by Chemical Formula (5-9).

[Chem. 29]

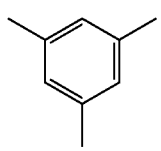

(4-1)

-continued

[Chem. 30]

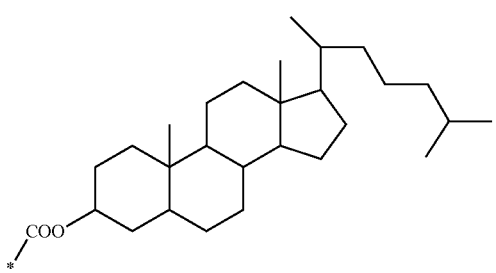

(4-2)

Further, in a case where the monomer unit in Chemical Formula (7) has the structure Y', the structure Y' includes the structure represented by Chemical Formula (12-1) Note that the structure Y' does not include a side chain represented as the structure Z.

[Chem. 31]

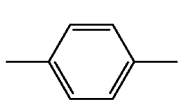

(12-1)

Note that an introduction ratio of the structure Y in Chemical Formula (7) is 0.3 (30%).

Synthesis Example 2

A polyamic acid (m=0.005), which was similar to that in Synthesis Example 1 except that m in Chemical Formula (7) was changed to 0.005, was synthesized.

Synthesis Example 3

A polyamic acid (m=0.01), which was similar to that in Synthesis Example 1 except that m in Chemical Formula (7) was changed to 0.01, was synthesized.

Synthesis Example 4

A polyamic acid (m=0.05), which was similar to that in Synthesis Example 1 except that m in Chemical Formula (7) was changed to 0.05, was synthesized.

Synthesis Example 5

A polyamic acid (m=0.10), which was similar to that in Synthesis Example 1 except that m in Chemical Formula (7) was changed to 0.10, was synthesized.

Comparative Example 1

(Production of Liquid Crystal Cell)

An interlayer insulating layer having the MRS structure in which rugged portions were formed on a surface thereof was formed on a glass substrate. Then, a reflective pixel electrode formed of aluminum (Al) was formed on the interlayer insulating layer to obtain one substrate (pixel electrode substrate). Note that in the inside of the interlayer insulating layer, NQD is included and a carboxylic acid compound derived from the NQD remains, the carboxylic acid compound being generated by light irradiation. Further, a common electrode formed of indium tin oxide (ITO) was formed on another glass substrate to obtain the other substrate (opposed substrate).

Then, a mixture of the polyamic acid prepared in Synthesis Example 1 and another polyamic acid which did not have the hydrazide functional group in a predetermined ratio was mixed with an organic solvent to prepare an alignment agent for a vertical alignment film. Then, the alignment agent was applied by spin-coating to form films on the pixel electrode substrate and the opposed substrate, respectively. The film was formed on the pixel electrode substrate so as to cover the reflective pixel electrode, and the film was formed on the opposed substrate so as to cover the common electrode. The films on the respective substrates were heated at 80° C. for two minutes for pre-firing, and then heated at 200° C. for 40 minutes for main firing. Then, a rubbing processing was formed with respect to the films, respectively, and the respective films were washed with water to form an alignment film on each substrate.

Next, a frame shape was drawn with a sealing material for one drop filling (ODF) in an uncured state on the alignment film of the pixel electrode substrate by using a dispenser. Note that an ultraviolet curable and thermosetting sealing material was used as the sealing material. A liquid crystal material ($\Delta\varepsilon=-5.5$) having a negative dielectric anisotropy was added dropwise in an inner side of the sealing material in the frame shape, and then the pixel electrode substrate and the opposed substrate were bonded to each other through the sealing material.

The pixel electrode substrate and the opposed substrate bonded to each other were heated (annealed) at a temperature equal to or higher than $T_{NI}$ (nematic-isotropic phase transition temperature) of the liquid crystal material for 30 minutes, and a realignment processing was performed on the alignment films to obtain a reflective vertical alignment type liquid crystal cell.

Example 1

An alignment agent was prepared similarly to Comparative Example 1 except that the polyamic acid (having the hydrazide functional group, m=0.005) of Synthesis Example 2 was used instead of the polyamic acid of Synthesis Example 1. Further, a reflective vertical alignment type liquid crystal cell of Example 1 was prepared similarly to Comparative Example 1 except that the alignment agent was used.

Example 2

An alignment agent was prepared similarly to Comparative Example 1 except that the polyamic acid (having the hydrazide functional group, m=0.01) of Synthesis Example 3 was used instead of the polyamic acid of Synthesis Example 1. Further, a reflective vertical alignment type liquid crystal cell of Example 2 was prepared similarly to Comparative Example 1 except that the alignment agent was used.

Example 3

An alignment agent was prepared similarly to Comparative Example 1 except that the polyamic acid (having the hydrazide functional group, m=0.05) of Synthesis Example 4 was used instead of the polyamic acid of Synthesis Example 1. Further, a reflective vertical alignment type liquid crystal cell of Example 3 was prepared similarly to Comparative Example 1 except that the alignment agent was used.

Example 4

An alignment agent was prepared similarly to Comparative Example 1 except that the polyamic acid (having the hydrazide functional group, m=0.10) of Synthesis Example 5 was used instead of the polyamic acid of Synthesis Example 1. Further, a reflective vertical alignment type liquid crystal cell of Example 4 was prepared similarly to Comparative Example 1 except that the alignment agent was used.

[Energization Test]

The respective liquid crystal cells of Comparative Example 1 and Examples 1 to 4 were energized (1 Hz rectangular wave) at 25° C. and 3 V for 1000 hours, and a voltage holding ratio (VHR) and a residual DC voltage (rDC) of the liquid crystal cell were measured before and after the energization (at the time of starting the test (0 hour) and 1000 hours later after starting the test).

Note that the voltage holding ratio was measured at 1 V and 70° C. by using a VHR measurement system model 6254 (manufactured by TOYO Corporation). Further, the residual DC voltage (V) was measured by a flicker removal method after applying a DC offset voltage of 2 V to the liquid crystal cells for 2 hours. Each result is shown in Table 1.

TABLE 1

| | m IN CHEMICAL FORMULA(7) | 0 HOURS VHR (%) | 0 HOURS rDC (V) | AFTER 1000 HOURS VHR (%) | AFTER 1000 HOURS rDC (V) |
|---|---|---|---|---|---|
| COMPARATIVE EXAMPLE 1 | 0 | 98.3 | 0.04 | 93.0 | 0.32 |
| EXAMPLE 1 | 0.005 | 98.3 | 0.04 | 96.6 | 0.09 |
| EXAMPLE 2 | 0.01 | 98.5 | 0.04 | 97.7 | 0.07 |
| EXAMPLE 3 | 0.05 | 98.5 | 0.03 | 97.9 | 0.07 |
| EXAMPLE 4 | 0.10 | 98.5 | 0.03 | 97.9 | 0.05 |

In a case of Comparative Example 1 (m=0 in Chemical Formula (7)), the voltage holding ratio and the residual DC deteriorated after 1000 hours from the start of the energization test. It is surmised that this is because a radical derived from a carboxyl group formed by a reaction between the carboxylic acid compound derived from the NQD, which remains in the interlayer insulating layer, and an ion (aluminum ion) from the reflective pixel electrode is eluted into the alignment film and the liquid crystal layer (negative liquid crystal material).

Whereas, in a case of Examples 1 to 4, as a value of m in Chemical Formula (7) was increased, a decrease in VHR after 1000 hours became small and the rDC also became small. It is surmised that this is because the hydrazide functional group introduced into the alignment film and the aluminum ion formed a complex to suppress the redox reaction illustrated in FIG. 2.

Note that the value of m in Chemical Formula (7) can be appropriately adjusted to be in a range of 0 to 0.1 (10% introduction) depending on a liquid crystal alignment state. However, in a case where m is larger than 0.1 (the introduction amount is larger than 10%), a viscosity becomes excessively high due to an influence of a bridge between polymer molecules, so that film formation is hindered.

Synthesis of Polyamic Acid

Synthesis Example 6

A polyamic acid (m=0) represented by Chemical Formula (8) in which m is 0 was synthesized.

[Chem. 32]

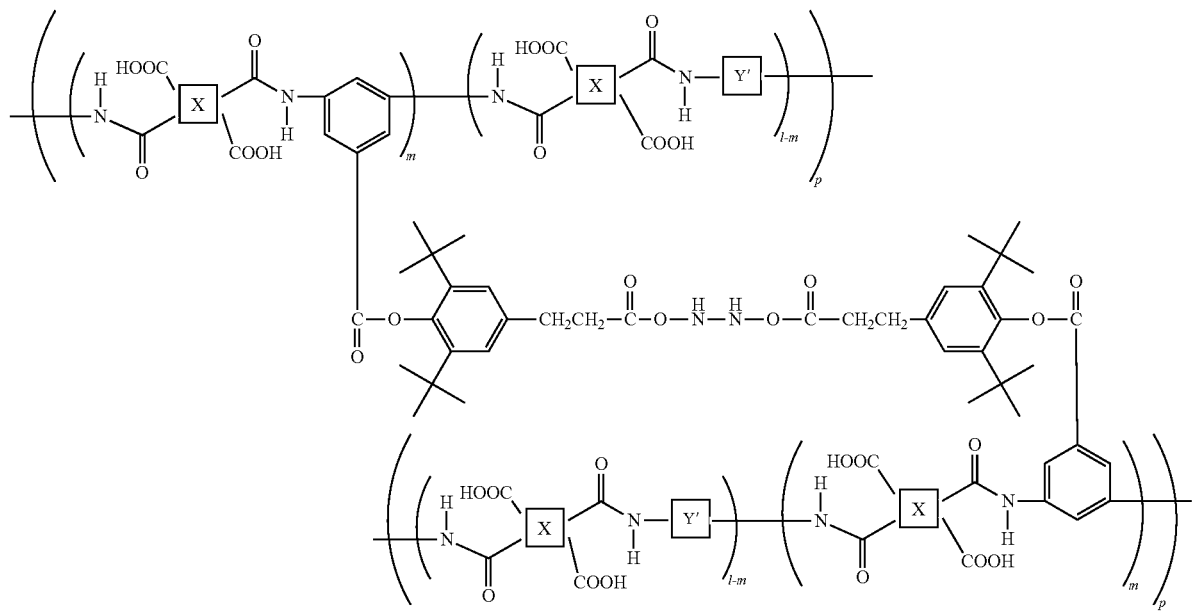

(8)

p (polymerization degree) in Chemical Formula (8) is any natural number. Further, X in Chemical Formula (8) is the structure represented by Chemical Formula (3-5).

[Chem. 33]

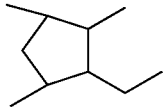

(3-5)

Further, Y' in Chemical Formula (8) is the structure represented by Chemical Formula (12-1).

[Chem. 34]

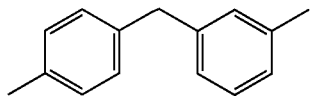

(12-2)

Synthesis Example 7

A polyamic acid (m=0.005), which was similar to that in Synthesis Example 5 except that m in Chemical Formula (8) was changed to 0.005, was synthesized.

Synthesis Example 8

A polyamic acid (m=0.01), which was similar to that in Synthesis Example 5 except that m in Chemical Formula (8) was changed to 0.01, was synthesized.

Synthesis Example 9

A polyamic acid (m=0.05), which was similar to that in Synthesis Example 5 except that m in Chemical Formula (8) was changed to 0.05, was synthesized.

Synthesis Example 10

A polyamic acid (m=0.10), which was similar to that in Synthesis Example 5 except that m in Chemical Formula (8) was changed to 0.10, was synthesized.

Comparative Example 2

(Production of Liquid Crystal Cell)

An interlayer insulating layer having the MRS structure in which rugged portions were formed on a surface thereof was formed on a glass substrate. Then, a reflective pixel electrode formed of silver (Ag) was formed on the interlayer insulating layer, an inorganic film formed of SiN was formed thereon, and a common electrode formed of ITO was further formed thereon to form one substrate (pixel electrode substrate). Note that in the inside of the interlayer insulating layer, NQD is included and a carboxylic acid compound derived from the NQD remains, the carboxylic acid compound being generated by light irradiation. Further, the other substrate (opposed substrate) formed of a glass substrate or the like was prepared.

Then, a mixture of the polyamic acid prepared in Synthesis Example 6 and another polyamic acid which did not have the hydrazide functional group in a predetermined ratio was mixed with an organic solvent to prepare an alignment agent for a horizontal alignment film. Then, the alignment agent was applied by spin-coating to form films on the pixel electrode substrate and the opposed substrate, respectively. Note that the film was formed on the pixel electrode substrate so as to cover the reflective pixel electrode.

The films on the respective substrates were heated at 80° C. for two minutes for pre-firing, and then heated at 200° C. for 40 minutes for main firing. Then, a rubbing processing was formed with respect to the films, respectively, and the respective films were washed with isopropyl alcohol (IPA) to form an alignment film on each substrate.

Next, a frame shape was drawn with a sealing material for one drop filling (ODF) in an uncured state on the alignment film of the one substrate (pixel electrode substrate) by using a dispenser. Note that an ultraviolet curable and thermosetting sealing material was used as the sealing material. A liquid crystal material ($\Delta\varepsilon=-5.0$) having a negative dielectric anisotropy was added dropwise in an inner side of the sealing material in the frame shape, and then the pixel electrode substrate and the opposed substrate were bonded to each other through the sealing material.

The pixel electrode substrate and the opposed substrate bonded to each other were heated (annealed) at a temperature equal to or higher than $T_{NI}$ (nematic-isotropic phase transition temperature) of the liquid crystal material for 30 minutes, and a realignment processing was performed on the alignment films to obtain a reflective FFS mode type liquid crystal cell.

Example 5

An alignment agent was prepared similarly to Comparative Example 2 except that the polyamic acid (having the hydrazide functional group, m=0.005) of Synthesis Example 7 was used instead of the polyamic acid of Synthesis Example 6. Further, a reflective FFS mode type liquid crystal cell of Example 5 was prepared similarly to Comparative Example 2 except that the alignment agent was used.

Example 6

An alignment agent was prepared similarly to Comparative Example 2 except that the polyamic acid (having the hydrazide functional group, m=0.01) of Synthesis Example 8 was used instead of the polyamic acid of Synthesis Example 6. Further, a reflective FFS mode type liquid crystal cell of Example 6 was prepared similarly to Comparative Example 2 except that the alignment agent was used.

Example 7

An alignment agent was prepared similarly to Comparative Example 2 except that the polyamic acid (having the hydrazide functional group, m=0.05) of Synthesis Example 9 was used instead of the polyamic acid of Synthesis Example 6. Further, a reflective FFS mode type liquid crystal cell of Example 7 was prepared similarly to Comparative Example 2 except that the alignment agent was used.

Example 8

An alignment agent was prepared similarly to Comparative Example 2 except that the polyamic acid (having the hydrazide functional group, m=0.10) of Synthesis Example 7 was used instead of the polyamic acid of Synthesis Example 6. Further, a reflective FFS mode type liquid crystal cell of Example 8 was prepared similarly to Comparative Example 2 except that the alignment agent was used.

[Energization Test]

Similarly to Example 1 and the like, the respective liquid crystal cells of Comparative Example 2 and Examples 5 to 8 were energized (1 Hz rectangular wave) at 25° C. and 3 V for 1000 hours, and a voltage holding ratio (VHR) and a residual DC voltage (rDC) of the liquid crystal cell were measured before and after the energization (at the time of starting the test (0 hours), and 1000 hours later after starting the test). Each result is shown in Table 2.

TABLE 2

| | m IN CHEMICAL FORMULA(8) | 0 HOURS VHR (%) | 0 HOURS rDC (V) | AFTER 1000 HOURS VHR (%) | AFTER 1000 HOURS rDC (V) |
|---|---|---|---|---|---|
| COMPARATIVE EXAMPLE 2 | 0 | 98.5 | 0.04 | 92.9 | 0.30 |
| EXAMPLE 5 | 0.005 | 98.5 | 0.04 | 97.3 | 0.08 |
| EXAMPLE 6 | 0.01 | 98.5 | 0.04 | 97.8 | 0.06 |
| EXAMPLE 7 | 0.05 | 98.6 | 0.04 | 98.1 | 0.06 |
| EXAMPLE 8 | 0.10 | 98.7 | 0.03 | 98.1 | 0.04 |

In a case of Comparative Example 2 (m=0 in Chemical Formula (8)), the voltage holding ratio and the residual DC deteriorated after 1000 hours from the start of the energization test. It is surmised that this is because a radical derived from a carboxyl group formed by a reaction between the carboxylic acid compound derived from the NQD, which remains in the interlayer insulating layer, and an ion (silver ion) from the reflective pixel electrode is eluted into the alignment film and the liquid crystal layer (negative liquid crystal material).

Whereas, in a case of Examples 5 to 8, as a value of m in Chemical Formula (8) was increased, a decrease in VHR after 1000 hours became small and the rDC also became small. It is surmised that this is because the hydrazide functional group introduced into the alignment film and the silver ion formed a complex to suppress the redox reaction illustrated in FIG. 2.

Note that the value of m in Chemical Formula (8) can be appropriately adjusted to be in a range of 0 to 0.1 (10% introduction) depending on a liquid crystal alignment state. However, in a case where m is larger than 0.1 (the introduction amount is larger than 10%), a viscosity becomes excessively high due to an influence of a bridge between polymer molecules, so that film formation is hindered.

Synthesis of Polyamic Acid

Synthesis Example 11

A polyamic acid (m=0) represented by Chemical Formula (2) in which m was 0 was synthesized.

[Chem. 32]

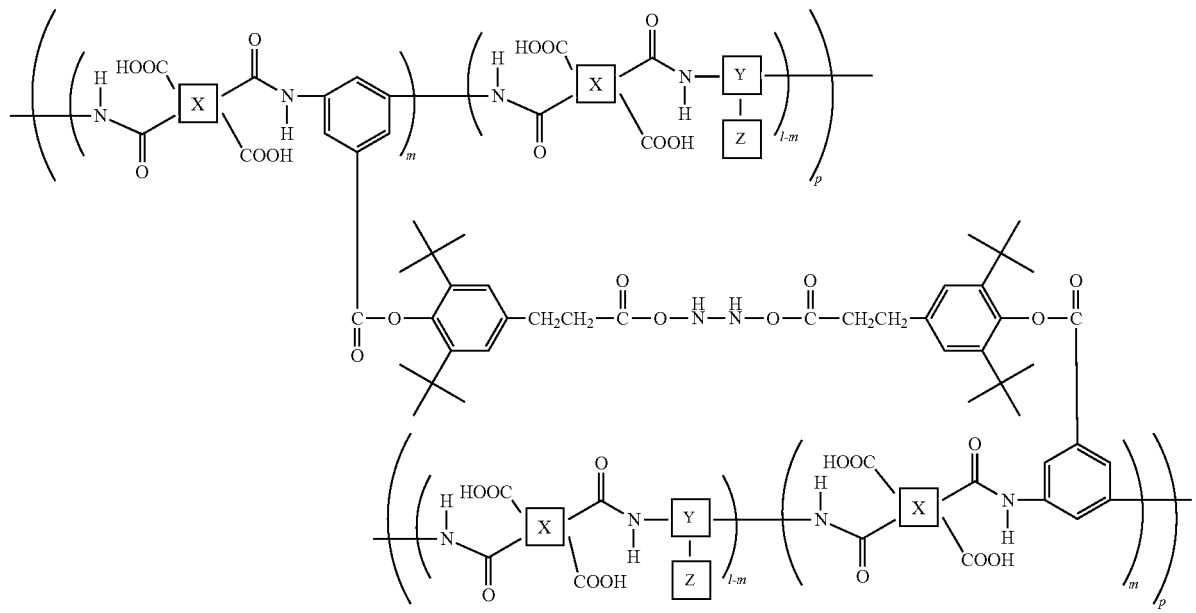

(2)

p in Chemical Formula (2) is any natural number. Further, X in Chemical Formula (2) is the structure represented by Chemical Formula (3-5).

[Chem. 36]

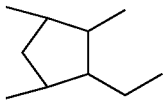

(3-5)

Further, Y in Chemical Formula (2) is a structure represented by Chemical Formula (4-17), and Z in Chemical Formula (2) is a structure represented by Chemical Formula (5-38).

[Chem. 37]

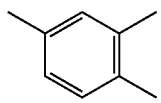
(4-17)

[Chem. 38]

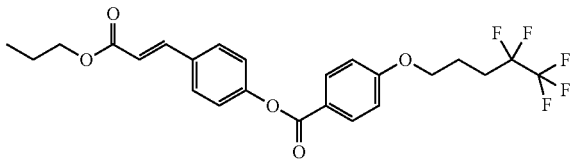
(5-38)

Synthesis Example 12

A polyamic acid (m=0.005), which was similar to that in Synthesis Example 11 except that m in Chemical Formula (2) is changed to 0.005, was synthesized.

Synthesis Example 13

A polyamic acid (m=0.01), which was similar to that in Synthesis Example 11 except that m in Chemical Formula (2) was changed to 0.01, was synthesized.

Synthesis Example 14

A polyamic acid (m=0.05), which was similar to that in Synthesis Example 11 except that m in Chemical Formula (2) was changed to 0.05, was synthesized.

Synthesis Example 15

A polyamic acid (m=0.10), which was similar to that in Synthesis Example 11 except that m in Chemical Formula (2) was changed to 0.10, was synthesized.

Comparative Example 3

(Production of Liquid Crystal Cell)
An interlayer insulating layer having the MRS structure in which rugged portions were formed on a surface thereof was formed on a glass substrate. Then, a reflective pixel electrode formed of aluminum (Al) was formed on the interlayer insulating layer to obtain one substrate (pixel electrode substrate). Note that in the inside of the interlayer insulating layer, NQD is included and a carboxylic acid compound derived from the NQD remains, the carboxylic acid compound being generated by light irradiation. Further, a common electrode formed of ITO was formed on another glass substrate to obtain the other substrate (opposed substrate).

Then, a mixture of the polyamic acid prepared in Synthesis Example 11 and another polyamic acid which did not have the hydrazide functional group in a predetermined ratio was mixed with an organic solvent to prepare an alignment agent for a vertical alignment film. Then, the alignment agent was applied by spin-coating to form films on the pixel electrode substrate and the opposed substrate, respectively. The film was formed on the pixel electrode substrate so as to cover the reflective pixel electrode, and the film was formed on the opposed substrate so as to cover the common electrode.

The films on the respective substrates were heated at 80° C. for two minutes for pre-firing, and then heated at 200° C. for 40 minutes for main firing. Then, an optical alignment processing was performed by irradiating each film with 20 mJ/cm$^2$ of polarized ultraviolet rays in a direction inclined at 40° with respect to a normal direction of the substrate.

Next, a frame shape was drawn with a sealing material for one drop filling (ODF) in an uncured state on the alignment film of the pixel electrode substrate by using a dispenser. Note that an ultraviolet curable and thermosetting sealing material was used as the sealing material. A liquid crystal material ($\Delta\varepsilon=-6.0$) having a negative dielectric anisotropy was added dropwise in an inner side of the sealing material in the frame shape, and then the pixel electrode substrate and the opposed substrate were bonded to each other through the sealing material.

The pixel electrode substrate and the opposed substrate bonded to each other were heated (annealed) at a temperature equal to or higher than $T_{NI}$ (nematic-isotropic phase transition temperature) of the liquid crystal material for 30 minutes, and a realignment processing was performed on the alignment films to obtain a reflective vertical alignment type liquid crystal cell.

Example 9

An alignment agent was prepared similarly to Comparative Example 3 except that the polyamic acid (having the hydrazide functional group, m=0.005) of Synthesis Example 12 was used instead of the polyamic acid of Synthesis Example 11. Further, a reflective vertical alignment type liquid crystal cell of Example 9 was prepared similarly to Comparative Example 3 except that the alignment agent was used.

Example 10

An alignment agent was prepared similarly to Comparative Example 3 except that the polyamic acid (having the hydrazide functional group, m=0.01) of Synthesis Example 13 was used instead of the polyamic acid of Synthesis Example 11. Further, a reflective vertical alignment type liquid crystal cell of Example 10 was prepared similarly to Comparative Example 3 except that the alignment agent was used.

Example 11

An alignment agent was prepared similarly to Comparative Example 3 except that the polyamic acid (having the hydrazide functional group, m=0.05) of Synthesis Example 14 was used instead of the polyamic acid of Synthesis Example 11. Further, a reflective vertical alignment type liquid crystal cell of Example 11 was prepared similarly to Comparative Example 3 except that the alignment agent was used.

Example 12

An alignment agent was prepared similarly to Comparative Example 3 except that the polyamic acid (having the hydrazide functional group, m=0.10) of Synthesis Example 15 was used instead of the polyamic acid of Synthesis Example 11. Further, a reflective vertical alignment type liquid crystal cell of Example 12 was prepared similarly to Comparative Example 3 except that the alignment agent was used.

[Energization Test]
Similarly to Example 1 and the like, the respective liquid crystal cells of Comparative Example 3 and Examples 9 to 12 were energized (1 Hz rectangular wave) at 25° C. and 3

V for 1000 hours, and a voltage holding ratio (VHR) and a residual DC voltage (rDC) of the liquid crystal cell were measured before and after the energization (at the time of starting the test (0 hour), and 1000 hours later after starting the test). Each result is shown in Table 3.

TABLE 3

| | m IN CHEMICAL FORMULA(2) | 0 HOURS VHR (%) | 0 HOURS rDC (V) | AFTER 1000 HOURS VHR (%) | AFTER 1000 HOURS rDC (V) |
|---|---|---|---|---|---|
| COMPARATIVE EXAMPLE 3 | 0 | 98.4 | 0.07 | 94.3 | 0.51 |
| EXAMPLE 9 | 0.005 | 98.4 | 0.07 | 97.0 | 0.43 |
| EXAMPLE 10 | 0.01 | 98.7 | 0.07 | 98.1 | 0.23 |
| EXAMPLE 11 | 0.05 | 98.7 | 0.07 | 98.1 | 0.16 |
| EXAMPLE 12 | 0.10 | 98.7 | 0.07 | 98.2 | 0.11 |

In a case of Comparative Example 3 (m=0 in Chemical Formula (2)), the voltage holding ratio and the residual DC deteriorated after 1000 hours from the start of the energization test. It is surmised that this is because a radical derived from a carboxyl group formed by a reaction between the carboxylic acid compound derived from the NQD, which remains in the interlayer insulating layer, and an ion (aluminum ion) from the reflective pixel electrode is eluted into the alignment film and the liquid crystal layer (negative liquid crystal material).

Whereas, in a case of Examples 9 and 10, as a value of m in Chemical Formula (2) was increased, a decrease in VHR after 1000 hours became small and the rDC also became small. It is surmised that this is because the hydrazide functional group introduced into the alignment film and the aluminum ion formed a complex to suppress the redox reaction illustrated in FIG. 2.

Note that the value of m in Chemical Formula (2) can be appropriately adjusted to be in a range of 0 to 0.1 (10% introduction) depending on a liquid crystal alignment state. However, in a case where m is larger than 0.1 (the introduction amount is larger than 10%), a viscosity becomes excessively high due to an influence of a bridge between polymer molecules, so that film formation is hindered.

Further, the values of rDC in Examples 9 and 10 tend to be generally larger than those in Examples 1 to 8 described above. It is surmised that this is because the vertical optical alignment films in Examples 9 and 10 have a characteristic that it is easy to trap impurities having charges such as ionicity (radical) on a surface of the alignment film.

Synthesis of Polysiloxane

Synthesis Example 16

Polysiloxane (m=0) represented by Chemical Formula (9) in which m was 0 was synthesized.

[Chem. 39]

(9)

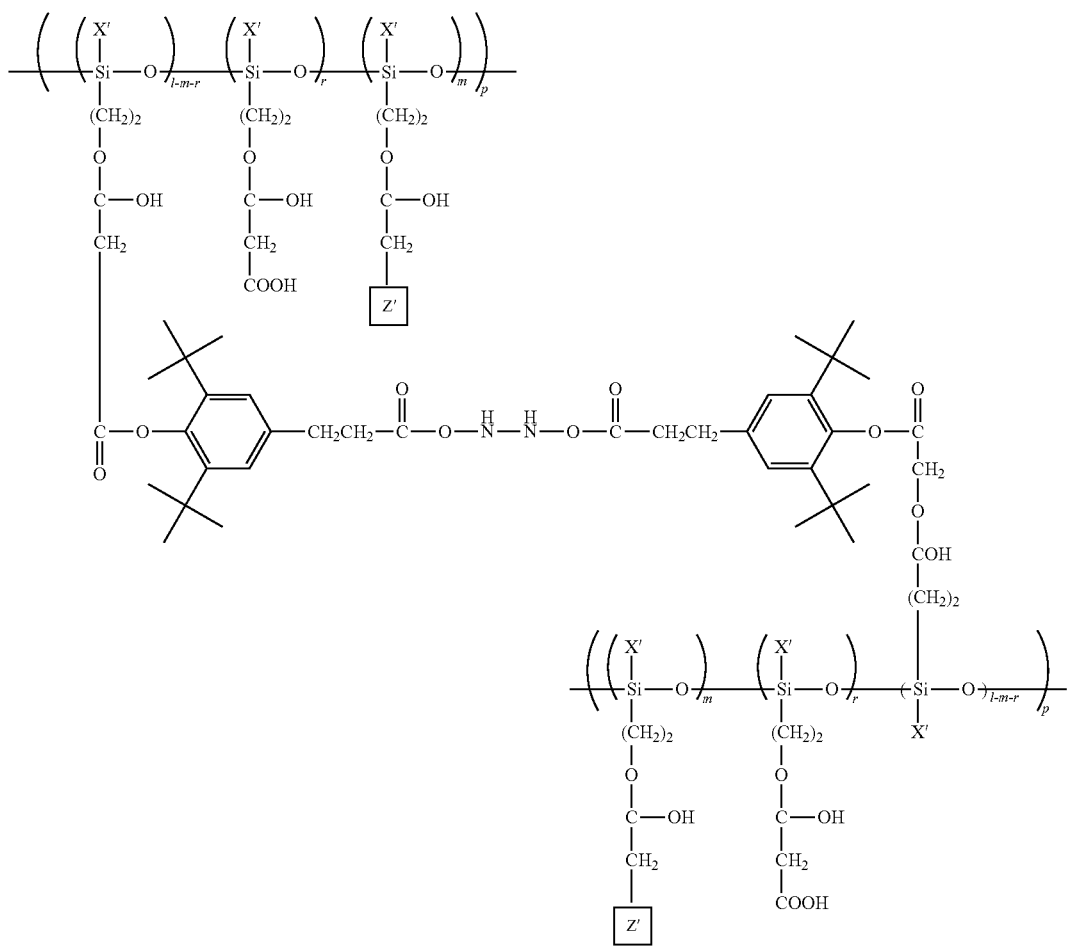

p (polymerization degree) in Chemical Formula (9) is any natural number, r is 0 or more and less than 1 ($0 \leq r < 1$), and $m+r<1$. Further, Z in Chemical Formula (9) is the structure represented by Chemical Formula (10-1) or Chemical Formula (10-2).

[Chem. 40]

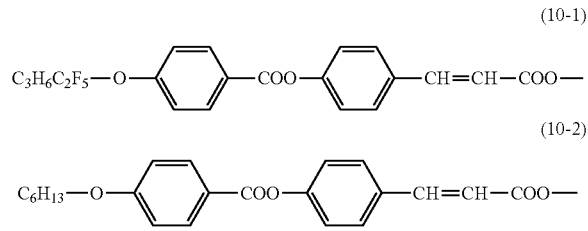

Further, X' in Chemical Formula (9) is a methoxy group ($CH_3O—$).

Synthesis Example 17

Polysiloxane (m=0.005), which was similar to that in Synthesis Example 16 except that m in Chemical Formula (9) was changed to 0.005, was synthesized.

Synthesis Example 18

Polysiloxane (m=0.01), which was similar to that in Synthesis Example 16 except that m in Chemical Formula (9) was changed to 0.01, was synthesized.

Synthesis Example 19

Polysiloxane (m=0.05), which was similar to that in Synthesis Example 16 except that m in Chemical Formula (9) was changed to 0.05, was synthesized.

Synthesis Example 17

Polysiloxane (m=0.10), which was similar to that in Synthesis Example 16 except that m in Chemical Formula (9) was changed to 0.10, was synthesized.

Comparative Example 4

(Production of Liquid Crystal Cell)
An interlayer insulating layer having the MRS structure in which rugged portions were formed on a surface thereof was formed on a glass substrate. Then, a reflective pixel electrode formed of silver (Ag) was formed on the interlayer insulating layer to obtain one substrate (pixel electrode substrate). Note that in the inside of the interlayer insulating layer, NQD is included and a carboxylic acid compound derived from the NQD remains, the carboxylic acid compound being generated by light irradiation. Further, a common electrode formed of ITO was formed on another glass substrate to obtain the other substrate (opposed substrate).

Then, a mixture of the polysiloxane prepared in Synthesis Example 16 and a polyamic acid which did not have the hydrazide functional group in a predetermined ratio was mixed with an organic solvent to prepare an alignment agent for a vertical alignment film. Then, the alignment agent was applied by spin-coating to form films on the pixel electrode substrate and the opposed substrate, respectively. The film was formed on the pixel electrode substrate so as to cover the reflective pixel electrode, and the film was formed on the opposed substrate so as to cover the common electrode.

The films on the respective substrates were heated at 80° C. for two minutes for pre-firing, and then heated at 230° C. for 40 minutes for main firing. Then, an optical alignment processing was performed by irradiating each film with 20 mJ/cm$^2$ of polarized ultraviolet rays in a direction inclined at 40° with respect to a normal direction of the substrate.

Next, a frame shape was drawn with a sealing material for one drop filling (ODF) in an uncured state on the alignment film of the pixel electrode substrate by using a dispenser. Note that an ultraviolet curable and thermosetting sealing material was used as the sealing material. A liquid crystal material ($\Delta\varepsilon=-5.5$) having a negative dielectric anisotropy was added dropwise in an inner side of the sealing material in the frame shape, and then the pixel electrode substrate and the opposed substrate were bonded to each other through the sealing material.

The pixel electrode substrate and the opposed substrate bonded to each other were heated (annealed) at a temperature equal to or higher than $T_{NI}$ (nematic-isotropic phase transition temperature) of the liquid crystal material for 30 minutes, and a realignment processing was performed on the alignment films to obtain a reflective vertical alignment type liquid crystal cell.

Example 13

An alignment agent was prepared similarly to Comparative Example 4 except that the polysiloxane (having the hydrazide functional group, m=0.005) of Synthesis Example 17 was used instead of the polysiloxane of Synthesis Example 16. Further, a reflective vertical alignment type liquid crystal cell of Example 13 was prepared similarly to Comparative Example 4 except that the alignment agent was used.

Example 14

An alignment agent was prepared similarly to Comparative Example 4 except that the polysiloxane (having the hydrazide functional group, m=0.01) of Synthesis Example 18 was used instead of the polysiloxane of Synthesis Example 16. Further, a reflective vertical alignment type liquid crystal cell of Example 14 was prepared similarly to Comparative Example 4 except that the alignment agent was used.

Example 15

An alignment agent was prepared similarly to Comparative Example 4 except that the polysiloxane (having the hydrazide functional group, m=0.05) of Synthesis Example 19 was used instead of the polysiloxane of Synthesis Example 16. Further, a reflective vertical alignment type liquid crystal cell of Example 15 was prepared similarly to Comparative Example 4 except that the alignment agent was used.

Example 16

An alignment agent was prepared similarly to Comparative Example 4 except that the polysiloxane (having the hydrazide functional group, m=0.10) of Synthesis Example 20 was used instead of the polysiloxane of Synthesis Example 16. Further, a reflective vertical alignment type liquid crystal cell of Example 16 was prepared similarly to Comparative Example 4 except that the alignment agent was used.

[Energization Test]

Similarly to Example 1 and the like, the respective liquid crystal cells of Comparative Example 4 and Examples 13 to 16 were energized (1 Hz rectangular wave) at 25° C. and 3 V for 1000 hours, and a voltage holding ratio (VHR) and a residual DC voltage (rDC) of the liquid crystal cell were measured before and after the energization (at the time of starting the test (0 hour), and 1000 hours later after starting the test). Each result is shown in Table 4.

TABLE 4

| | m IN CHEMICAL FORMULA(9) | 0 HOURS | | AFTER 1000 HOURS | |
|---|---|---|---|---|---|
| | | VHR (%) | rDC (V) | VHR (%) | rDC (V) |
| COMPARATIVE EXAMPLE 4 | 0 | 98.8 | 0.04 | 93.8 | 0.12 |
| EXAMPLE 13 | 0.005 | 98.8 | 0.03 | 97.0 | 0.08 |
| EXAMPLE 14 | 0.01 | 98.9 | 0.01 | 97.9 | 0.05 |
| EXAMPLE 15 | 0.05 | 99.0 | 0.01 | 98.4 | 0.02 |
| EXAMPLE 16 | 0.10 | 99.0 | 0.00 | 98.5 | 0.02 |

In a case of Comparative Example 4 (m=0 in Chemical Formula (9)), the voltage holding ratio and the residual DC deteriorated after 1000 hours from the start of the energization test. It is surmised that this is because a radical derived from a carboxyl group formed by a reaction between the carboxylic acid compound derived from the NQD, which remains in the interlayer insulating layer, and an ion (silver ion) from the reflective pixel electrode is eluted into the alignment film and the liquid crystal layer (negative liquid crystal material).

Whereas, in a case of Examples 13 to 16, as a value of m in Chemical Formula (9) was increased, a decrease in VHR after 1000 hours became small and the rDC also became small. It is surmised that this is because the hydrazide functional group introduced into the alignment film and the silver ion formed a complex to suppress the redox reaction illustrated in FIG. 2.

Note that the value of m in Chemical Formula (9) can be appropriately adjusted to be in a range of 0 to 0.1 (10% introduction) depending on a liquid crystal alignment state. However, in a case where m is larger than 0.1 (the introduction amount is larger than 10%), a viscosity becomes excessively high due to an influence of a bridge between polymer molecules, so that film formation is hindered.

Further, the values of VHR in Examples 13 to 16 tend to be generally larger than those in Examples 9 to 12 described above, and the values of rDC in Examples 13 to 16 tend to be generally smaller than those in Examples 9 to 12 described above. It is surmised that this is because the polysiloxane type vertical optical alignment films in Examples 13 to 16 have a characteristic that it is difficult to trap impurities having charges such as ionicity (radical).

EXPLANATION OF SYMBOLS

1A: Liquid crystal display device (Reflective type)
10A: Liquid crystal cell
11: Pixel electrode substrate
11a: Alignment film
12: Opposed substrate
12a: Alignment film
13, 14: Supporting substrate
15: Thin film transistor
16: Interlayer insulating layer
17: Reflective pixel electrode
18: Color filter
19: Common electrode
LC: Liquid crystal layer
M: Micro reflective structure

The invention claimed is:

1. A liquid crystal cell comprising:
a pair of substrates facing each other and having alignment films formed on surfaces of the substrates, respectively, the surfaces facing each other; and
a liquid crystal layer interposed between the substrates,
wherein the alignment films contain a polymer for alignment films which has a hydrazide functional group represented by Chemical Formula (1)

[Chem. 1]

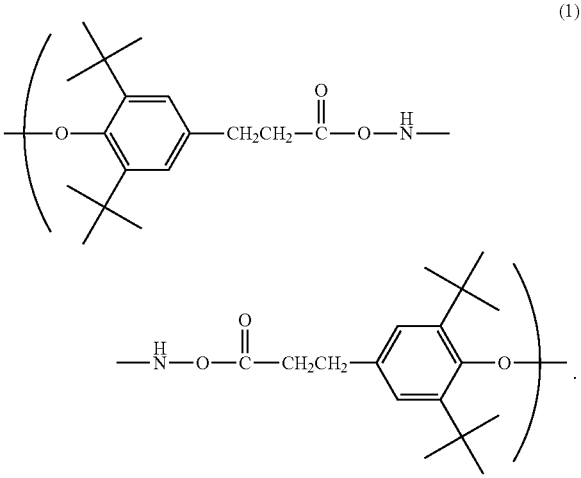

(1)

2. The liquid crystal cell according to claim 1, wherein the polymer for alignment films has a main chain including at least one selected from the group consisting of a polyamic acid, polyimide, polysiloxane, polyacryl, polymethacryl, and polyvinyl, and the hydrazide functional group is connected to the main chain.

3. The liquid crystal cell according to claim 1, wherein the main chain of the polymer for alignment films includes a polyamic acid and/or polyimide.

4. The liquid crystal cell according to claim 1, wherein the polymer for alignment films has a photoreactive functional group.

5. The liquid crystal cell according to claim 4, wherein the photoreactive functional group is at least one selected from the group consisting of a cinnamate group, a chalcone group, a coumarin group, an azobenzene group, and a tolane group.

6. The liquid crystal cell according to claim 1, wherein the polymer for alignment films is a polyamic acid represented by Chemical Formula (2) or an imide product of the polyamic acid,

[Chem. 2]
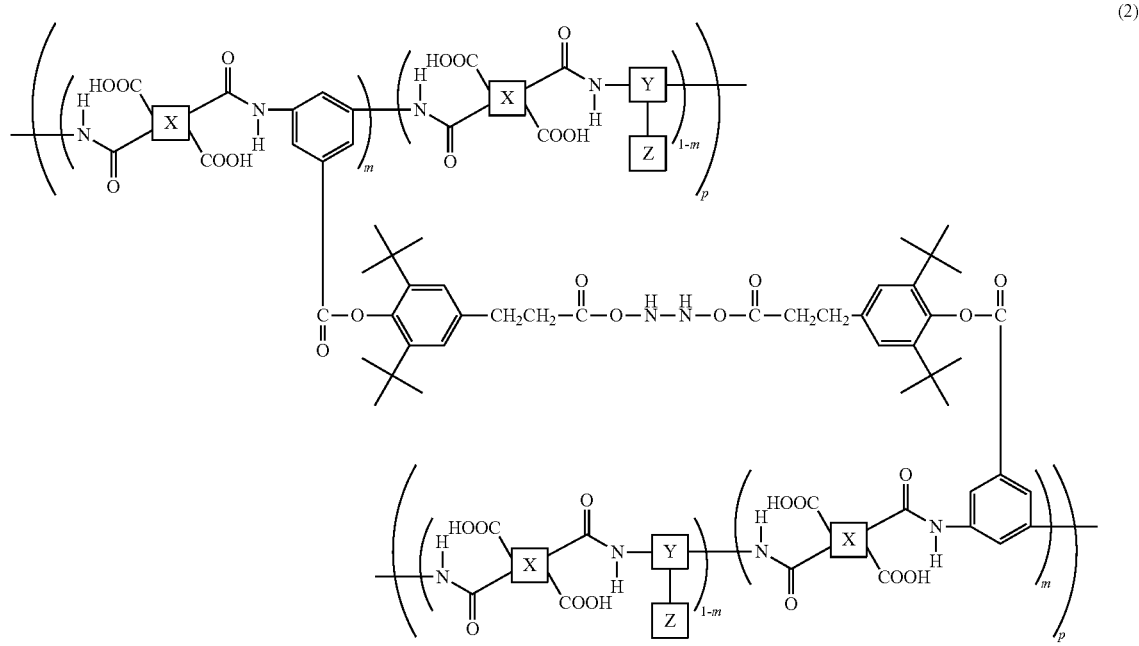
(2)
where, in Chemical Formula (2), p is any natural number, in is 0.001 or more and 0.1 or less, X includes structures represented by Chemical Formulas (3-1) to (3-12), Y includes structures represented by Chemical Formulas (4-1) to (4-17), and Z includes structures represented by Chemical Formulas (5-1) to (5-8)
[Chem. 3]
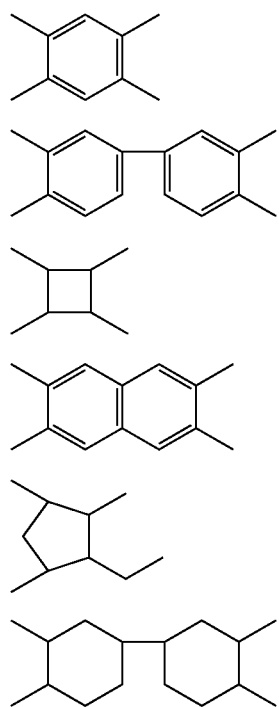
(3-1)
(3-2)
(3-3)
(3-4)
(3-5)
(3-6)
-continued
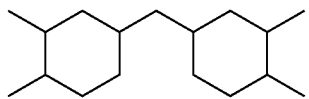
(3-7)
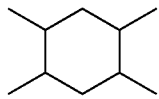
(3-8)
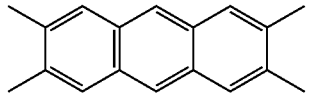
(3-9)
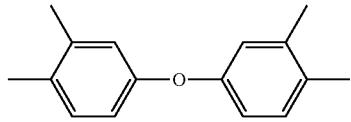
(3-10)
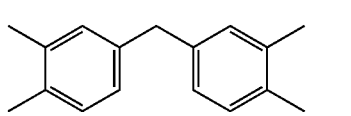
(3-11)
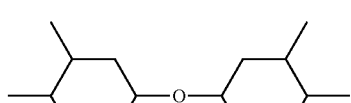
(3-12)
[Chem. 4]
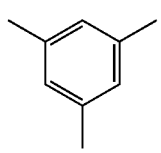
(4-1)

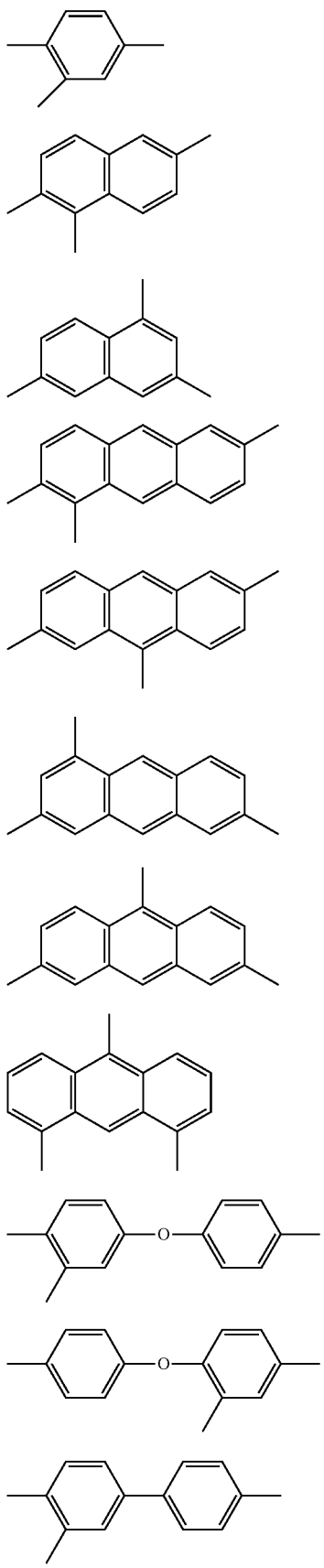
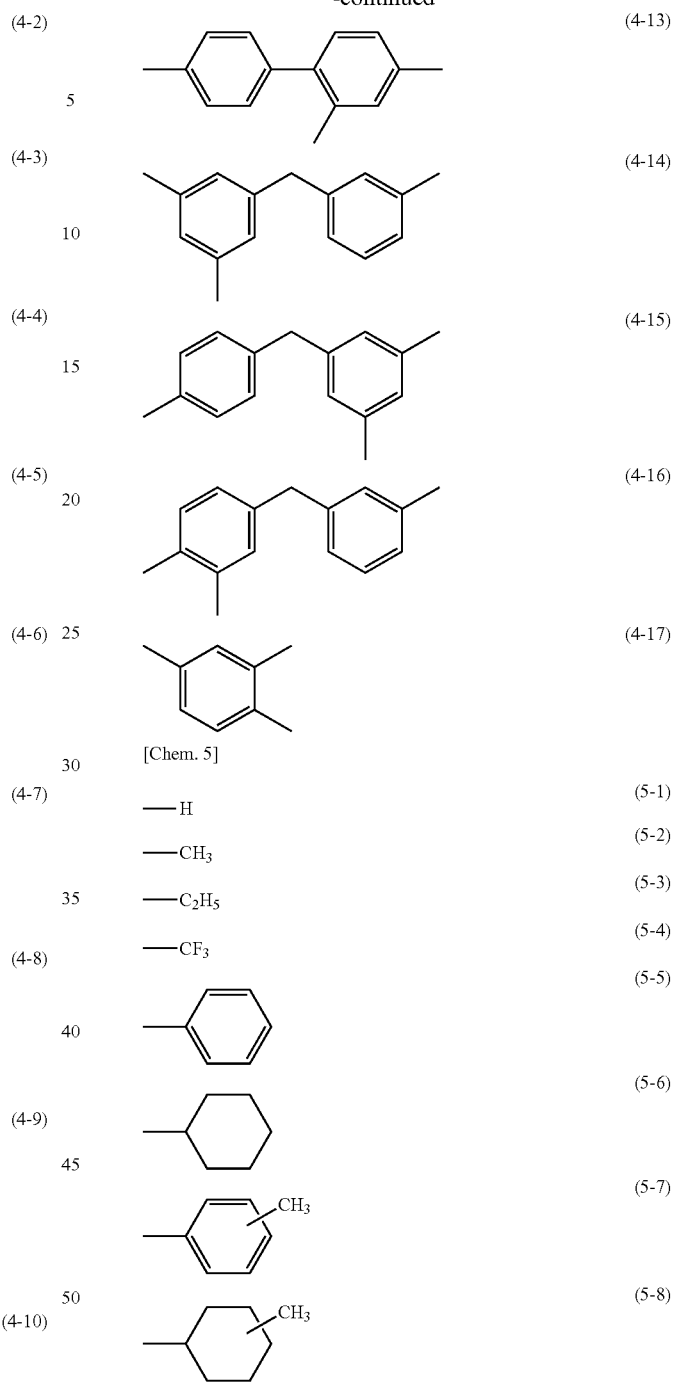

7. The liquid crystal cell according to claim 1, wherein the liquid crystal layer contains a liquid crystal material having a negative dielectric anisotropy ($\Delta\varepsilon$).

8. The liquid crystal cell according to claim 7, wherein the dielectric anisotropy ($\Delta\varepsilon$) of the liquid crystal material is $-0.5$ or less.

9. The liquid crystal cell according to claim 1, wherein at least one of the pair of substrates includes an electrode formed of at least one material selected from the group consisting of aluminum (Al), silver (Ag), zinc (Zn), copper (Cu), and alloys thereof.

10. The liquid crystal cell according to claim 9, wherein the electrode is formed on an insulating layer.

11. The liquid crystal cell according to claim 10, wherein the insulating layer is formed of a positive photoresist material.

12. The liquid crystal cell according to claim 9, wherein the electrode has a micro reflective structure in which multiple rugged portions are formed on a surface of the electrode.

13. The liquid crystal cell according to claim 1, wherein the liquid crystal cell is a reflective type liquid crystal cell or a semi-transmissive liquid crystal cell.

14. The liquid crystal cell according to claim 1, wherein a display mode of the liquid crystal cell is any one of a vertical alignment twisted nematic (VA-TN) mode, a vertical alignment electrically controlled birefringence (VA-ECB) mode, an in-plane switching (IPS) mode, and a fringe field switching (FFS) mode.

15. A liquid crystal display device comprising the liquid crystal cell according to claim 1.

* * * * *